United States Patent
Budhani et al.

(10) Patent No.: US 10,554,622 B2
(45) Date of Patent: *Feb. 4, 2020

(54) SECURE APPLICATION DELIVERY SYSTEM WITH DIAL OUT AND ASSOCIATED METHOD

(71) Applicant: Akamai Technologies, Inc., Cambridge, MA (US)

(72) Inventors: Haseeb Siddique Budhani, Santa Clara, CA (US); Seetharama Sarma Ayyadevara, San Jose, CA (US); Hanumantharao Kavuluru, San Jose, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,701

(22) Filed: Jan. 28, 2019

(65) Prior Publication Data

US 2019/0158462 A1 May 23, 2019

Related U.S. Application Data

(63) Continuation of application No. 15/344,884, filed on Nov. 7, 2016, now Pat. No. 10,193,860, which is a
(Continued)

(51) Int. Cl.
*H04L 29/06* (2006.01)
*H04L 29/08* (2006.01)

(52) U.S. Cl.
CPC ...... *H04L 63/0218* (2013.01); *H04L 63/0263* (2013.01); *H04L 63/0281* (2013.01); *H04L 63/04* (2013.01); *H04L 63/0457* (2013.01); *H04L 63/0815* (2013.01); *H04L 63/0823* (2013.01); *H04L 63/105* (2013.01); *H04L 67/10* (2013.01); *H04L 67/1004* (2013.01); *H04L 67/34* (2013.01); *H04L 63/0428* (2013.01); *H04L 63/10* (2013.01); *H04L 63/108* (2013.01)

(58) Field of Classification Search
CPC ............ H04L 63/0281; H04L 63/0218; H04L 63/0263
See application file for complete search history.

(56) References Cited

U.S. PATENT DOCUMENTS

| | | | |
|---|---|---|---|
| 2004/0015725 A1* | 1/2004 | Boneh .................. | H04L 63/166 713/160 |
| 2006/0112276 A1* | 5/2006 | Coley .................. | G06Q 20/027 713/183 |

(Continued)

*Primary Examiner* — Chau Le
*Assistant Examiner* — Vance M Little
(74) *Attorney, Agent, or Firm* — David H. Judson

(57) ABSTRACT

A system is provided to deliver an application, hosted by a private application provider system, over a network to a user device, comprising: an application delivery system that includes a first network interface, a network security interface and a second network interface; wherein the network security interface is configured to determine whether a user or device request for access to an application is valid, and in response to determining that the user or device request for access to the first application is valid, to send the user or device request to the application agent.

6 Claims, 27 Drawing Sheets

Related U.S. Application Data continuation of application No. 14/564,789, filed on Dec. 9, 2014, now Pat. No. 9,491,145.

(60) Provisional application No. 62/080,064, filed on Nov. 14, 2014, provisional application No. 61/953,044, filed on Mar. 14, 2014.

(56) References Cited

U.S. PATENT DOCUMENTS

| | | | |
|---|---|---|---|
| 2014/0229525 A1* | 8/2014 | Crawford | G06F 9/54 709/203 |
| 2015/0006726 A1* | 1/2015 | Yuan | H04L 47/70 709/225 |

* cited by examiner

SECURE APPLICATION DELIVERY SYSTEM WITH DIAL OUT AND ASSOCIATED METHOD

BACKGROUND

An application program is a computer program, or group of programs, that configures a computer to perform functions directly for a user of the application. This is in contrast to system programs, which typically provide one or more software program infrastructure layers, such as an operating system, utilities and related components that manage and integrate a computer's capabilities but typically do not perform tasks directly for the user. In general, the system software serves the application, which in turn, serves the user.

A hosted application is an application that runs on a server that multiple user devices have shared access to over a network. A Browser may act as an interface between a hosted application and a user device, for example. Hosted applications may include client and server components in which a client that runs directly on a user device communicates over a network with a hosted component that runs on a server. A downloadable application, sometimes referred to as an "App," for example, may act as client interface between a hosted application and a user device. Hosted applications may run on dedicated servers owned and operated by an individual organization. Alternatively, hosted applications may run on a so called cloud computing platform in which servers are virtualized and hardware and software compute resources are shared by other hosted applications.

Enterprises have been trained to think of security in terms of a physical barrier at the perimeter of the network. This model worked well as recently as five years ago when all applications were deployed in enterprise controlled data centers and an IT department controlled not only the application, but the server and networking infrastructures, as well as the data center real estate.

Today, enterprises have a cost-effective option available in the form of public clouds, which can be utilized in addition to the enterprise datacenter strategy. Public cloud deployments can enable enterprises to enjoy reduction in operational (including manpower) and capital expenditures. Some enterprises are therefore choosing to maintain hybrid environments where applications are deployed in the most practical location, be it an enterprise-controlled data center, infrastructure-as-a-service (IaaS) platform, or another similar point of presence.

In many cases, hosted applications act as a utility to enterprise employees to carry out their day-to-day activities. It is important to make sure that only users that are allowed access to a particular application can actually access it, and more importantly, that no external bad actors can access these hosted applications. To achieve this, enterprises have traditionally deployed a multi-layer security infrastructure.

A traditional multi-layer security infrastructure can pose a number of practical challenges. First, for example, each security feature presents a technical challenge to configure and manage, with the enterprises having to make a tradeoff between the level of security that it can deliver on the one hand, and the skillset and operational expertise required to configure and maintain the security on the other hand. This tradeoff may result in an enterprise choosing to deliver a less-than-ideal user experience. For example, users may only be allowed access to certain applications from a branch office location or users may only be allowed access to certain applications from certified devices.

In the past, some enterprises have concluded that the safest approach is to house all hosted applications in a single location. Nevertheless, for business reasons enterprises often house hosted applications in multiple locations. One common security model used by enterprises that house hosted applications at multiple locations involves a "moat" approach in which the enterprise builds a full-service security moat around each physical location housing hosted applications so that each location is protected independently, leading to higher operational and capital expenditures. Another common security model involves a "port of entry" approach in which the enterprise designates a physical location as the entry point for all application traffic. Traffic destined for other physical locations is routed through an overlay, enterprise-managed network (typically built using private links, e.g., IPSec tunnels, etc.), leading to higher end-to-end round-trip times and, consequently, degraded performance. Some enterprises may also deploy a combination of the moat and port of entry approaches.

SUMMARY

In one aspect, a system is provided to deliver an application, hosted by a private application provider system, over a network to a user device. An application delivery system includes a first network interface, a network security interface and a second network interface. An application agent is disposed within the private application provider system. The application agent is configured to create a first pool of communication paths between the application agent and the second network interface. The first interface is configured to receive a user or device request for access to a first application and to send the user or device request to the network security interface. The second network interface is configured to create a corresponding communication path with the network security interface for each communication path in the first pool of communication paths. The network security interface is configured to determine whether the user or device request for access to the first application is valid, and in response to determining that the user or device request for access to the first application is valid, to send the user or device request to the application agent over a communication path selected from communication paths with second network interface instances that correspond to communication paths within the first pool of communication paths.

DESCRIPTION OF EMBODIMENTS

Figure 1:
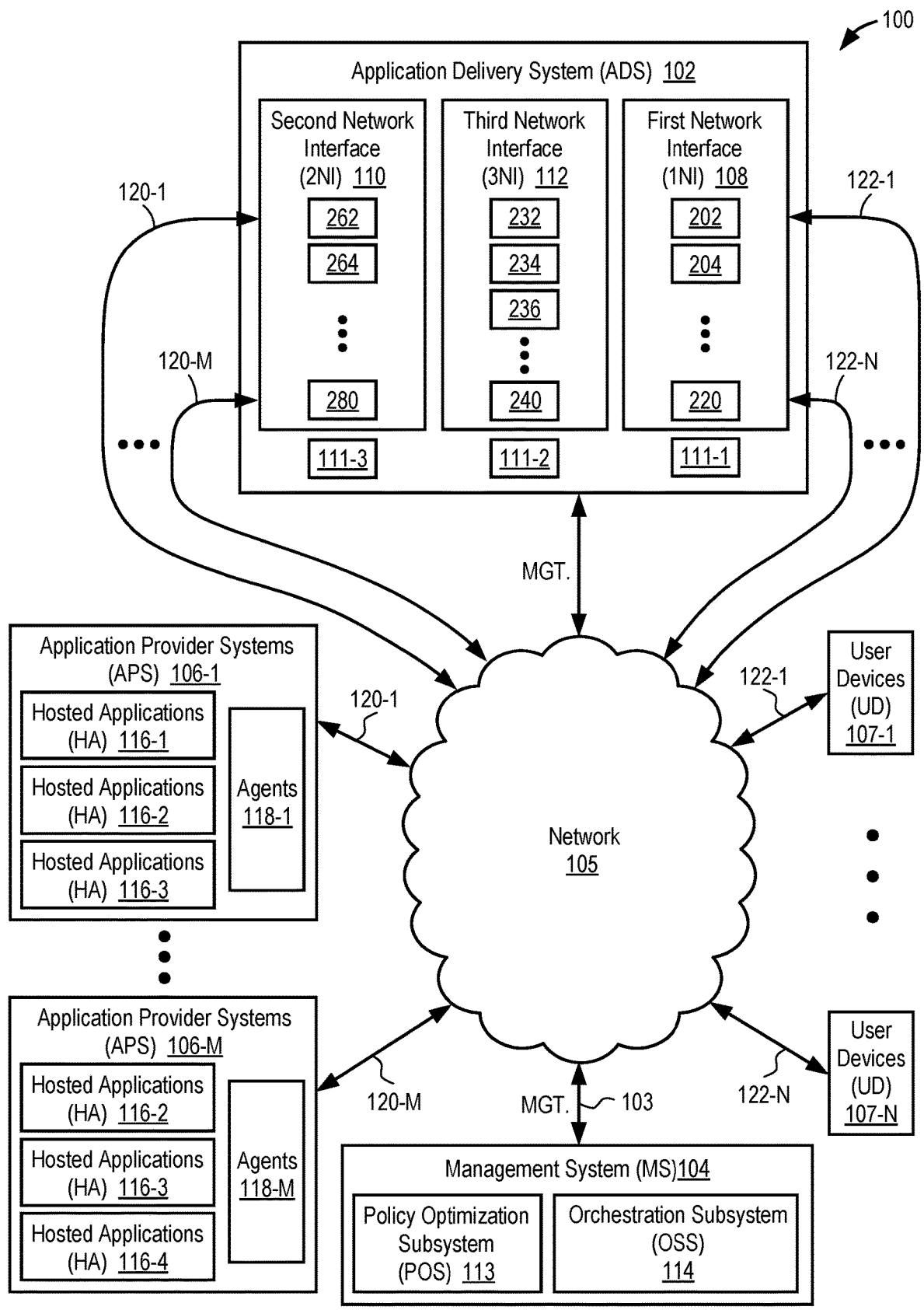
FIG. 1 is an illustrative architecture level block diagram representing a security management system in accordance with some embodiments.

The following description is presented to enable any person skilled in the art to create and use a dynamically scalable secure application delivery system and associated method. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Terminology

Throughout this disclosure, there is reference to "connection," "communication path" and "network communication path." As used herein, these terms are used interchangeably to refer to logical two-way communication paths that permit communication of information between two endpoints. A communication path may include multiple connections. The terms "connection," "communication path" and "network communication path" may refer to one or more individual HTTP(S) connections that create such a logical path. An individual connection includes two endpoints, one on each end of the connection, which include data structures used to manage the flow of information through the connection and include associated buffers used in the sending and receiving of information over the connection.

System Overview

FIG. 1 is an illustrative architecture level block diagram representing a security management system 100 that includes an application delivery system 102 and management system 104 to impose policy based secure access to hosted applications 116 from application provider systems 106 to user devices 107 over a network 105 in accordance with some embodiments. Delivery of an application involves providing user device access to a hosted application that runs on a server that is accessible to user devices over the network 105. More particularly, delivery of a hosted application may involve providing user device access over the network 105 to services, functionality and information provided by the hosted application, for example.

An application provider may be an individual, a company or other entity, for example, which makes available an application provider system 106. In some embodiments, an application provider system 106 hosts an application within a data center. In general, a data center includes a private environment that includes one or more computer systems, maintained by an entity, such as a business, within which critical applications are housed. A data center typically also includes a number of security systems (e.g. firewalls) that act to block unwanted, unfettered access from outside the data center. A data center can be maintained from the real-estate up by the business, or may include a virtualized computer environment that uses virtual machines that run on shared computation and storage resources in a shared network environment, such as a cloud computing environment, also referred to as "Infrastructure as a Service (IaaS)."

A private application provider system comprises a private network. In some embodiments, a private network operates on a private address space that is protected behind a firewall that that hides internal private network addresses (e.g., IP addresses) from an external network, such as the Internet, by applying network and/or port address translation for traffic to and from the private network. Moreover, a firewall typically allows only select traffic to enter the private network from the external network.

The application delivery system 102 is configured to impart security services to communications over the network 105, which may include one or more networks, such as the Internet, between an application hosted within a private computing environment maintained by an application provider systems 106, e.g. a data center or a shared cloud computing platform, and an end-user device 107, such as a smartphone, media player, personal digital assistant (PDA), computer, laptop computer or tablet computing device. In some embodiments, a private application provider system is protected by a firewall from the network 105. The application delivery system 102 provides services that condition communication between end-user devices 107-1 to 107-N and applications hosted by a application provider system 106 upon meeting security requirements. The system 102 can be configured to provide end-user device access to applications hosted within a data center while ensuring that security requirements are met. In accordance with some embodiments, the application delivery system 102 can provide, in parallel, different sets of security services for different applications hosted by different provider systems.

The application delivery system 102 includes dynamically configurable first network interface 108, also referred to herein as the frontend traffic delivery layer 108 that manages flow of network traffic over the network 105 with multiple end-user devices 107-1 to 107-N and a dynamically configurable second network interface 110, also referred to herein as the backend traffic delivery layer 110 that manages flow of network traffic over the network 105 with multiple application provider systems 106-1 to 106-M. The application delivery system also includes a dynamically configurable network security interface 112, also referred to herein as the traffic processing layer 112, which provides security services to identify a device users making a connection requests since certain user may be blocked. The traffic processing layer 112 also may identify device type used to make a connection request since certain device types may be blocked. Moreover, the traffic processing layer 112 provides network connection stitching services to connect frontend user device network communication paths with backend provider systems network communication paths.

The application delivery system 102 includes a first performance monitoring module 111-1 to monitor load on traffic director instances within the frontend traffic delivery layer 108 and report to the management system 104. It includes a second performance monitoring module 111-2 to monitor load on traffic director instances within the backend traffic delivery layer 110 and report to the management system 104. It includes a third performance monitoring module 111-3 to monitor load on traffic processing service instances within the traffic processing layer 112 and report to the management system 104.

The orchestration subsystem 114 manages changes to the configuration of the application delivery system 102 and agents 118-1 to 118-M to meet performance objectives. The application delivery system 102 provides hardware compute resources, such as processors and storage devices, that can be used to independently scale up and scale down the layers 108, 110 and 112 on demand, under control of the management system 104, depending upon load, e.g., user demand or distributed attacks on service availability. More particularly, in response to determinations made using the policy optimization subsystem 113, the orchestration subsystem 114 can control the application delivery system 102 in scaling up and down the number of first network interface instances, also referred to herein as, frontend traffic director instances (202, 204, . . . 220) within the frontend traffic delivery layer 108, the number of second network interface instances, also referred to herein as, backend traffic director instances (262, 264, . . . 280) within the frontend traffic delivery layer 110 and the service providing instances (232, 234, 236, . . . 240) within the traffic processing layer 112.

Each of multiple application provider systems 106-1 to 106-M is configured to host at least one application. Applications 116-1, 116-2 and 116-3, for example, are shown hosted by provider system 106-1. Application 116-2, 116-3 and 116-4, for example, are shown hosted by provider system 106-M. Each of the multiple provider systems is configured to install one or more agents 118-1 to 118-M to manage communication between one or more hosted applications and the application delivery system 102. Thus, an agent can manage communications with multiple hosted applications. It will be understood that in managing communication between a user device and a hosted application, an agent manages flow of information after a user device has cleared security requirement imposed by the network security interface, that is, by the traffic processing layer 112. Moreover, multiple agents can be installed within a given provider system based upon factors such as a need to achieve high availability and maximal performance. The agents communicate with the management system 104 over the network 102 to obtain connection information for use to determine network communication paths to create with the backend traffic delivery layer 110 of the application delivery system 102. The management system 104 configures agents to each create a dynamic "pool" of network communication paths with the application delivery system 102 on behalf of each hosted application that it manages.

Each pool of network communication paths includes multiple network communication paths. The pools are "dynamic" in that the number of communication paths in a pool can change over time. The number of network communication paths in a pool can increase and decrease over time depending upon demand for the application served by the paths in the pool, for example. Moreover, the network communication paths are "pre-configured" in that a network communication path that is used to create a communication path between a user device and an agent is created prior to receipt of a user or device request that results in creation of that path between the user device and the agent. Thus, although some communication paths in a dynamic pool of network communication paths may be created or destroyed after a given user or device request is received, that given user or device request results in use of a communication path from the pool that was created before receipt of that given user or device request.

The management system 104 configures the application delivery system 102 and also configures the agents 118-1 to 118-M deployed at application provider systems 106-1 to 106-M via communication paths 103. In accordance with some embodiments, the management system 104 may dynamically determine the number of network communication paths in an application, agent connection pool for a given application. The determination of communication path pool size is dynamic in that the number of paths in a pool may vary over time depending upon demand for the application, for example. The policy optimization subsystem 113 monitors performance of the application delivery system 102, through the performance monitoring modules 111-1 to 111-3, and determines optimal configuration of the application delivery system 102 to achieve policy based performance objectives. Likewise, the policy optimization subsystem 113 monitors performance of the agents 118-1 to 118-4, and determines optimal configuration of the agents to achieve performance objectives.

The management system 104 can dynamically adjust configuration of the delivery system 102 and of the agents 118 based upon processing load and network traffic. For example, in operation the management system 104 may determine that an agent at a provider that has very high usage for a given application should configure an application agent connection pool, which is dedicated to communications with that given application, to have a larger number of connections between the system 102 and the agent. However, the management system 104 may determine that a different agent at a different provider that has lower usage for a given application should configure an application agent connection pool, which is dedicated to communications with that given application, to have a fewer number of connections. It will be appreciated that although only a few applications 116-1 to 116-4 are shown in the illustrative example embodiment security management system 100 and some of these are hosted by multiple providers, the system 100 may manage a wide variety of different applications in which different providers host different applications.

Multiple end-user devices 107-1 to 107-N, seeking to obtain access to one or more of the applications 116-1 to 116-4, dynamically create individual user device network communication paths 122-1 to 122-N with the frontend traffic delivery layer 108 of the application delivery system 102 to individually access individual hosted applications. The transaction processing layer 112 screens user device connections for security requirements and selectively stitches together frontend user device network communication paths with pre-existing backend application agent connections from a pre-configured application agent connection pool.

In operation, the application delivery system 102 isolates hosted applications from communication with user devices until after security requirements are satisfied. More particularly, the traffic processing layer 112 is functionally disposed between the frontend traffic director layer 108 and the backend traffic director layer 110 to ensure that security requirements are satisfied as a condition to stitching together an agent-initiated network communication path selected from a pool of such network communication paths that correspond to an application, and a user device-initiated network communication path corresponds to an end-user device so as to permit user device access to a provider-hosted application.

Assume, for example that user device 107-1 seeks to access hosted application 116-4. The traffic processing layer 112 determines whether security requirements are satisfied for the end-user device 107-1 to access hosted application 116-4. Assuming that security requirements are met, the traffic processing layer 112 stitches together one connection from application agent network connection pool 120-M, associated with the hosted application 116-4, and an end-user device network connection 122-1, associated with the end user device 107-1. With the stitching together complete, the application delivery system 102 acts as a bridge for communication between the agent 118-M and the end user device 107-1. The agent 118-M further inspects all traffic according to some embodiments, after which it too acts like a bridge, finally connecting the application 116-4 to the end user device 107-1.

In accordance with some embodiments, the application delivery system 102 stitches together application network connections (belonging to a connection pool initiated by an application agent) and end-user device network connections on a per user, per hosted application and per provider system basis so as to isolate communication traffic based upon user, based upon hosted application and based upon provider of the hosted application. Thus, for example, multiple different application provider systems can share compute resources of the application delivery system 102, while maintaining separation of communication traffic for different applications hosted by the same provider system and while also maintaining separation of communication traffic for the same application hosted by different providers systems, for example. This isolation of communication traffic allows for provision of different, customized, services and different, customized, accessibility/availability levels for different hosted applications and/or for different provider systems, for example.

Application Delivery System

Figure 2:
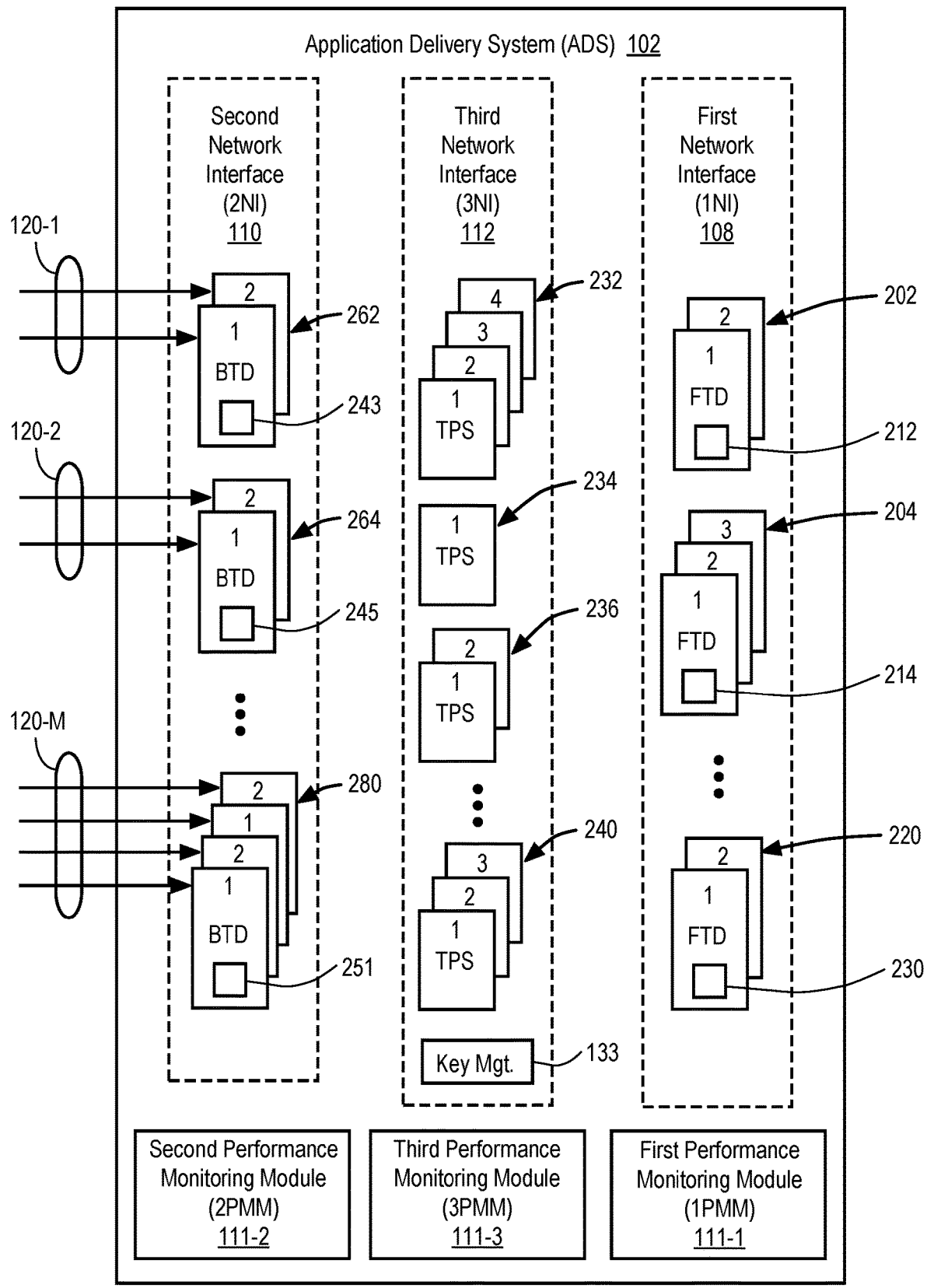
FIG. 2 is an illustrative block drawing showing certain details of an example configuration of the application delivery system of FIG. 1 in accordance with some embodiments.

FIG. 2 is an illustrative block drawing showing certain details of an example configuration of the application delivery system 102 in accordance with some embodiments. The frontend layer 108 includes a plurality of first network interface instances, referred to as frontend traffic director (FTD) instances, each associated with at least one network address, such as an IP address. The backend layer 110 includes a plurality of second network interface instances, referred to as backend traffic director (BTD) instances, each associated with at least one network address, such as an IP address. In accordance with some embodiments, each FTD is associated with a hosted application and a provider of the hosted application, and each BTD also is associated with a hosted application and a provider of the hosted application. The FTD instances and BTD instances access information in requests (received as one or more packets) being sent to hosted applications from end user devices to direct packets to traffic processing server traffic processing server (TPS) instances, which in turn apply routing and/or security policies. The FTD instances and BTD instances do not themselves decrypt packet data so as to avoid exposing encrypted packet data to exploitation at the edge of the delivery system 102. Rather, decryption occurs at the network security interface, i.e. the TPS layer 112, internal to the delivery system 102. Network security instances, referred to herein as TPS instances, are configured to decrypt received packets and to condition stitching together user device network communication paths to application agent network communication paths, which are created as part of an application agent connection pool, upon successful application of one or more routing and/or security policies to determine whether or not a user or device request is valid, typically including a user identification and a user authentication requirement. It will be appreciated that the term "frontend" and "backend" are terms of convenience used to distinguish between network interface instances configured as network interfaces to user devices on the external network 105 and network interface instances configured as network interfaces to application agents on the external network 105.

In some embodiments, the number of FTD instances, BTD instances and TPS instances or other instance types can be scaled independently with demand under control of the management system 104, for example. The number of FTD instances can scale independent of the number of BTD instances, and the number of network security instances, referred to herein as, TPS instances, can scale independently of the number of FTDs and BTDs. Assume for example, that an unauthorized attacker is trying to break into a hosted application by running a script that systematically tries out a large number of different passwords for a large number of users within a large company. At this instant, the load on the login servers (described below) may increase significantly. In response to that increased login load, the management system 104 may increase the number of login server instances, although the number of FTD, TPS and BTD instances is not increased. Alternatively, assume for example, that a large number of users begin downloading large files from a hosted application, and will hence tie up a number of FTD instances. In response to that increased download load, the management system 104 may increase the number of FTD instances and TPS instances to handle the increased volume of downloads, although the number of login server instances is not increased. Also, as system load such as, traffic volume and/or CPU usage and perhaps other system-wide characteristics vary, the management system may determine to add or terminate BTD instances.

Basically, for a given application, for example, there may be an increased system load resulting from an application due to increased use of compute, memory, disk, bandwidth (traffic volume), etc. Consequently, it may be necessary to add more resources (BTDs, TPSs and/or FTDs) to handle the extra load. Conversely, if the system load due to an application decreases, the number of instances dedicated to the application can be reduced.

As used herein an "instance" refers to a fully functional copy. It will be appreciated that the delivery system 102 includes hardware computer and storage resources that are configured to provide first network interface instance (i.e. FTD) functionality, second network interface instance (i.e. BTD) functionality, and network security interface (i.e. TPS) functionality. In some embodiments, scaling the number of first network interface instances (i.e. FTD instances), second network interface instances (i.e. BTD instances) and network security instances (i.e. TPS instances) involves increasing and decreasing the number of copies of each, depending upon demand. In accordance with some embodiments, FTD, BTD, TPS and other component functionality can be implemented using virtual machines (VMs) that timeshare the hardware resources, and the number of FTD, BTD and TPS instances is increased by spawning additional VMs and is decreased by releasing or destroying one or more of the VMs.

Alternatively, FTD, BTD, TPS and other component functionality can be implemented as process instances using operating system level virtualization in which different processes are partitioned to execute in different namespace partitions under the same operating system (OS) kernel, e.g. as Linux "containers." The OS kernel will run a single operating system and provide that operating system functionality to each of the components. Resources such as processors, storage and network I/O can be shared among processes executing in different namespace partitions. In accordance with some embodiments, different FTD, BTD and TPS instances can be implemented as Linux containers or independent instances.

Moreover, in accordance with some embodiments, FTDs and BTDs act as network interfaces with the external network 105. From a security perspective, FTDs and BTDs look at package information to direct traffic to the appropriate TPS instance. However, FTDs and BTDs do not decrypt data. TPS instances, however, actually process the payloads to perform functions such as applying security policies, checking the posture of the user accessing the app (e.g. whether the user has the right set of credentials, does he actually have permission to access the app given his current location, device type, etc.). TPS instances also stitch network communication paths together.

In some embodiments, the traffic processing layer 112 not only provides traffic stitching and user validation services, which may include user identification, which typically involves authentication checking services, but also, or alternatively, may provide services such as traffic encryption/decryption, end user identity management, end user authorization, end user session state storage, Layer 7 firewalling (also known as web application firewalling), intrusion prevention services (IPS), threat detection, anti-virus protection, analytics and business logic, for example. Each of these services may be provided using independently scalable modules, each dedicated to performing one or more of these specific functions. For example, some applications and/or some providers may require user identification/authentication. Other applications/providers may require not only identification/authorization, but also a determination as to whether a particular request is authorized. Other applications/providers may require deeper inspection of a request payload to scan for viruses or other malware, for example.

Moreover, during a denial of service attack, for example, network traffic may increase tremendously prompting the management system 104 to instruct the delivery system 102 to scale up the number of instances of a module dedicated to thwarting such an attack.

The application delivery system 102 includes a first network interface 108, between user devices and the delivery system 102. The first network interface 108 is referred to herein as the frontend traffic director layer 108. An example frontend traffic director layer 108 shown in FIG. 2 includes a first FTD group 202 with two FTD instances, a second FTD group 204 with three FTD instances and a third FTD group 220 with two instances. The application delivery system 102 also includes a second network interface 110, between application agents and the delivery system 102. The second network interface 110 is referred to herein as the backend traffic director layer 110. An example backend traffic director layer 110 shown in FIG. 2 includes a first BTD group 262 with two BTD instances, a second BTD group 264 with two BTD instances and a third BTD group 280 with four BTD instances. The example traffic processing layer 112 includes a first TPS group 232 with four TPS instances, a second TPS group 234 with one TPS instance, a third TPS group 236 with two TPS instances and a fourth TPS group 240 with three TPS instances. It will be appreciated that the example system 102 may include additional FTD instances, BTD instances and TPS instances that are not shown so as to avoid unnecessarily complicating the drawing and description.

Each of the FTD instances of the frontend traffic director layer 108 shown is configured to manage setup of logical communication paths between dynamically created end-user device network communication paths, e.g., 122-1 to 122-N, containing requests for access to hosted applications, and TPS instances within the traffic processing layer 112 associated with that application. For each hosted application served by the application delivery system 102, the management system 104 directs creation of a number of FTD instances and TPS instances sufficient to handle the demand for end-user or device requests for the application. Different hosted applications may require different numbers of FTD and TPS instances depending upon end-user demand.

Thus, in accordance with some embodiments, different FTDs may be associated with different hosted applications, and each FTD instance includes a mapping to one or more TPS instances. The two example FTD instances of the first FTD group 202 include mappings 212 (only one shown) to at least one of the TPS instances of the traffic processing layer 112. The three example FTD instances of the second FTD group 204 are associated with a mapping 214 to at least one TPS instance of the traffic processing layer 112. The two example FTD instances of the third FTD group 220 are associated with a mapping 230 to at least one TPS instance of the traffic processing layer 112. The mappings 212, 214, 230 are created at the direction of the management system 104 and are implemented as data structures, such as a mapping tables, in a non-transitory storage device. Thus, the mapping 212 is used to provide mappings between dynamic user network communication paths (not shown) with the FTD instances of the FTD group 202 and a mapped-to TPS instance. The mapping 214 is used to provide mappings between dynamic user network communication paths (not shown) with the FTD instances of the FTD group 204 and a mapped-to TPS instance. The mapping 230 is used to provide mappings between dynamic user network communication paths (not shown) with the FTD instances of the FTD group 220 and a mapped-to TPS instance.

The TPS layer also includes a key management module 133, which ensures that all traffic belonging to an application provider system 106 is secured using a unique set of security keys. The system also ensures that all communication within the application delivery system 102, between the end user devices 107 and the FTD instances 108, and between the application agents 118 and the BTD instances 110, are all carried out using unique security keys. All keys are further encrypted and stored in non-transitory systems that are designed to be tamper proof. In accordance with some embodiments, SSL encryption or IPsec encryption can be employed, for example. The details of the encryption schemes, key creation and maintenance schemes, and tamper proof storage of said keys are well known to persons skilled in the art and need not be described herein.

For each hosted application that is to be made available to end-user devices, the application delivery system 102 is configured to maintain a logical set of paths (connection pool) from its point of presence (POP) to the hosted application's point of presence. These paths generally are made available in advance of end-user device activity requesting access to the hosted application. All paths rely on connections from application agent connection pool 120-M that are initiated from the application connection agent 118-M that is present in the application provider system. A given path is only usable by a single end-user device at any given time, and only after the access has been fully inspected by all validation services (e.g., authentication, authorization, web application firewalling, etc.) configured for the hosted application. Referring now to both FIG. 1 and FIG. 2, each of the two BTDs of the first BTD group 262 has a pool 120-1 comprising preconfigured hosted application agent network connections with the agent 118-1 associated with a first hosted application 116-1. Each of the two BTDs of the third BTD group 264 has a preconfigured hosted application agent network connection pool 120-2 with a second agent (not shown) associated with a second hosted application (not shown). It will be appreciated that in the illustrative example system 100, a single agent 118-1 can be associated with hosted applications 116-1, 116-2 and 116-3, depending on configuration. Each of the four BTDs of the third BTD group 264 has a preconfigured hosted application agent connection pool 120-M with an Mth agent 118-M associated with an Mth hosted application 116-4. For each hosted application served by the application delivery system 102, the management system 104 directs creation of a number of BTD instances sufficient to handle end-user device demand for the hosted application.

As explained more fully below, the hosted application agent connections pools 120-1 to 120-M are created at request of the agents 118-1 to 118-M running on application provider systems 106-1 to 106-M. Thus, for example, agent 118-1 requests application agent connections pools 120-1 with each of the two BTDs of the first BTD group 262. These connections 120-1 to 120-M are made independent of, and in advance, of user or device requests for access to hosted applications. In other words, for example, the agent 118-1 requests application agent connection pools 120-1 with each of the two BTDs of the first BTD group 262 even before a user or device request to access hosted application 116-1. The size of this pool can vary depending on some embodiments and on the change in network load, available bandwidth, etc.

As explained above, one role of the individual TPSs within the traffic processing layer 112 is to stitch together dynamically created user-device network connections to FTDs within the frontend traffic delivery layer 108 with pre-configured network connections between agents and BTDs within the backend traffic delivery layer 110. Each BTD instance is associated with a mapping to one or more TPS instances. The two example BTD instances of the first BTD group 262 include a mapping 243 to at least one of the TPS instances of the TPS layer 112. The two example BTD instances of the second BTD group 264 include a mapping 245 to at least one TPS instance of the TPS layer 112. The four example BTD instances of the Mth BTD group 280 are associated with a mapping 251 to at least one TPS instance of the TPS layer 112. The mappings 243, 245, 251 are created at the direction of the management system 104 and are implemented as data structures, such as mapping tables, in a non-transitory storage device.

Assume for example that for a given application, one of the FTD instance mappings 212, 214, 230 maps a dynamically created end-user network connection (not shown) to a TPS instance of the second TPS group 232. In that case, during stitching, the mapping 242 can be used to stitch the mapped to end-user device network connection to an application connection associated with a BTD that the mapping 244 maps to. In accordance with some embodiments, stitching together an end-user device-side network connection and an application agent-side network connection may be contingent upon meeting security requirements. The result is that, contingent upon meeting security requirements, an end-to-end path (or bridge) is created, through the application delivery system 102, between an end-user device and an application (via an associated agent). It should be appreciated that this bridge has two inherent checkpoints where services can be applied: One within the TPS where the stitching takes place, and second within the application agent that initiated the application agent connection pool to the BTD. This bridge is used to deliver the application, or services provided using the application, to and from the end user's device.

Load Balancing

Figure 3:
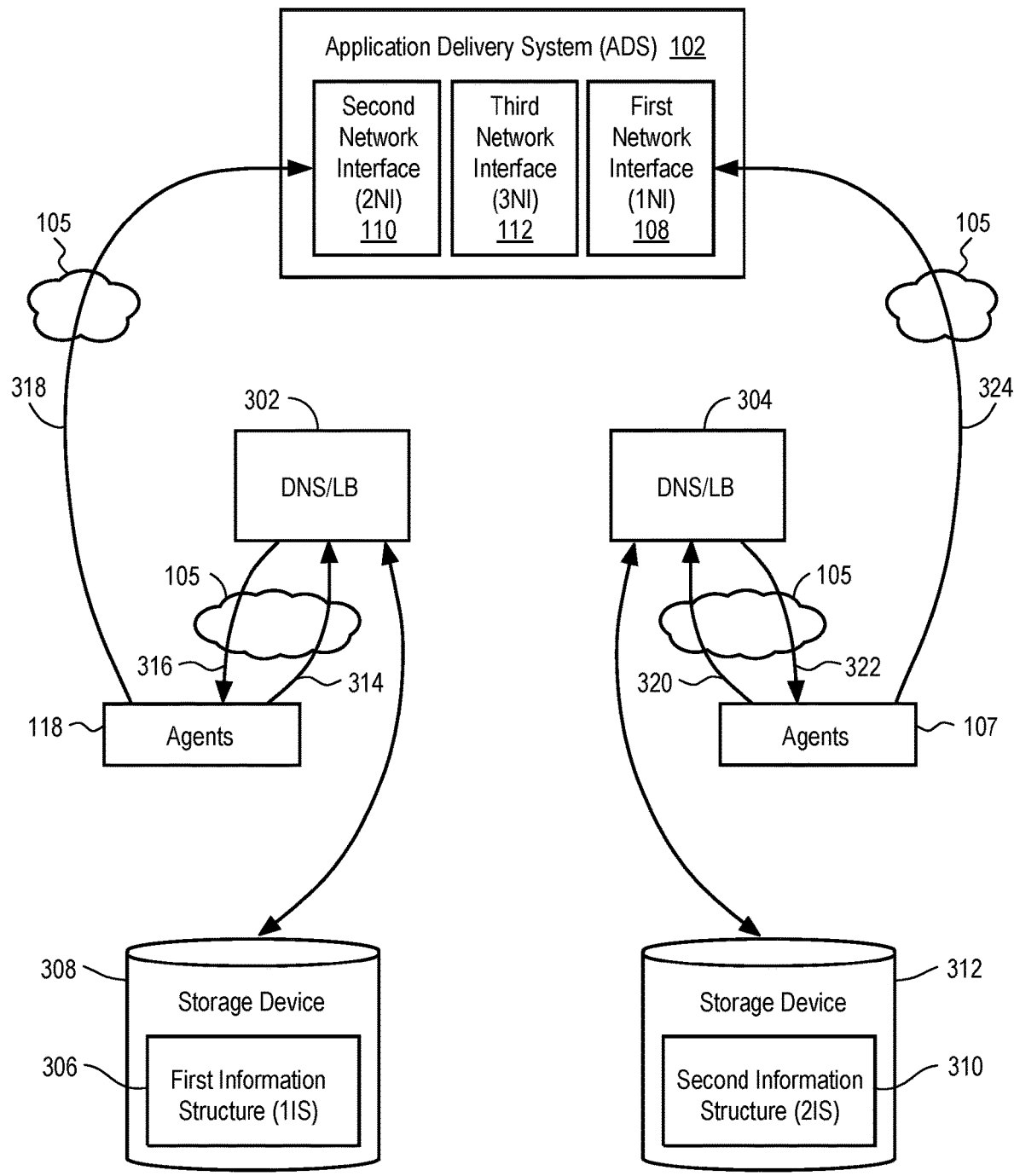
FIG. 3 is an illustrative block diagram representing message flow in the context of domain name system (DNS) server configured to perform load balancing in accordance with some embodiments.

FIG. 3 is an illustrative block diagram representing message flow in the context of domain name system (DNS) server configured to perform load balancing in accordance with some embodiments. A first DNS server 302 receives network address resolution requests from agents over the external network 105 for connections with the application delivery system 102. A second DNS server 304 receives network address resolution requests from user devices over the external network 105 for connections with the application delivery system 102. Arrow 305 indicates that the first DNS is associated with a first information structure 306 stored in a non-transitory machine readable storage device 308 that associates provider/application locator information with collections of BTD network addresses. Arrow 307 indicates that the second DNS is associated with a second information structure 310 stored in a non-transitory machine readable storage device 312 that associates provider/application locator information with collections of FTD network addresses.

In operation, an agent 118 sends a network address resolution request indicted by arrow 314 to the first DNS server 302 for a connection with a BTD instance for use in communication involving an application managed by the agent 118. The agent request 314 includes locator information that includes an indication of the identity of the hosted application provider system in which the agent is installed and the hosted application for which the connection is to be requested. In response to the request, the first server DNS 302 selects a network address from among one or more BTD instance addresses associated within the first information structure 306 with the indicted provider/application combination. The first DNS server 302 sends the selected BTD network address back over the network 105 as indicated by arrow 316 to the requesting agent 118, which in turn, sends a connection request indicated by arrow 318 to a BTD instance at the selected BTD network address.

Similarly, in operation, a user 107 sends a network address resolution request indicted by arrow 320 to the second DNS server 304 for a connection with an FTD instance. The user or device request 320 includes locator information that includes an indication of the identity of a hosted application provider system and the hosted application for which the connection is to be requested. In response to the request, the second DNS server 304 selects a network address from among one or more FTD instance addresses associated within the second information structure 310 with the indicted provider/application combination. The second DNS server 304 sends the selected FTD network address back over the network 105 as indicated by arrow 322 to the requesting user 107, which in turn, sends a connection request indicated by arrow 324 to an FTD instance at the selected FTD network address.

It will be appreciated that in operation, the functions identified as being carried out by 302 and 304 may be implemented on the same DNS server, which can in turn inform both agents and user devices of network addresses belonging to BTDs and FTDs to which said agents and user devices are supposed to connect.

Figure 4:
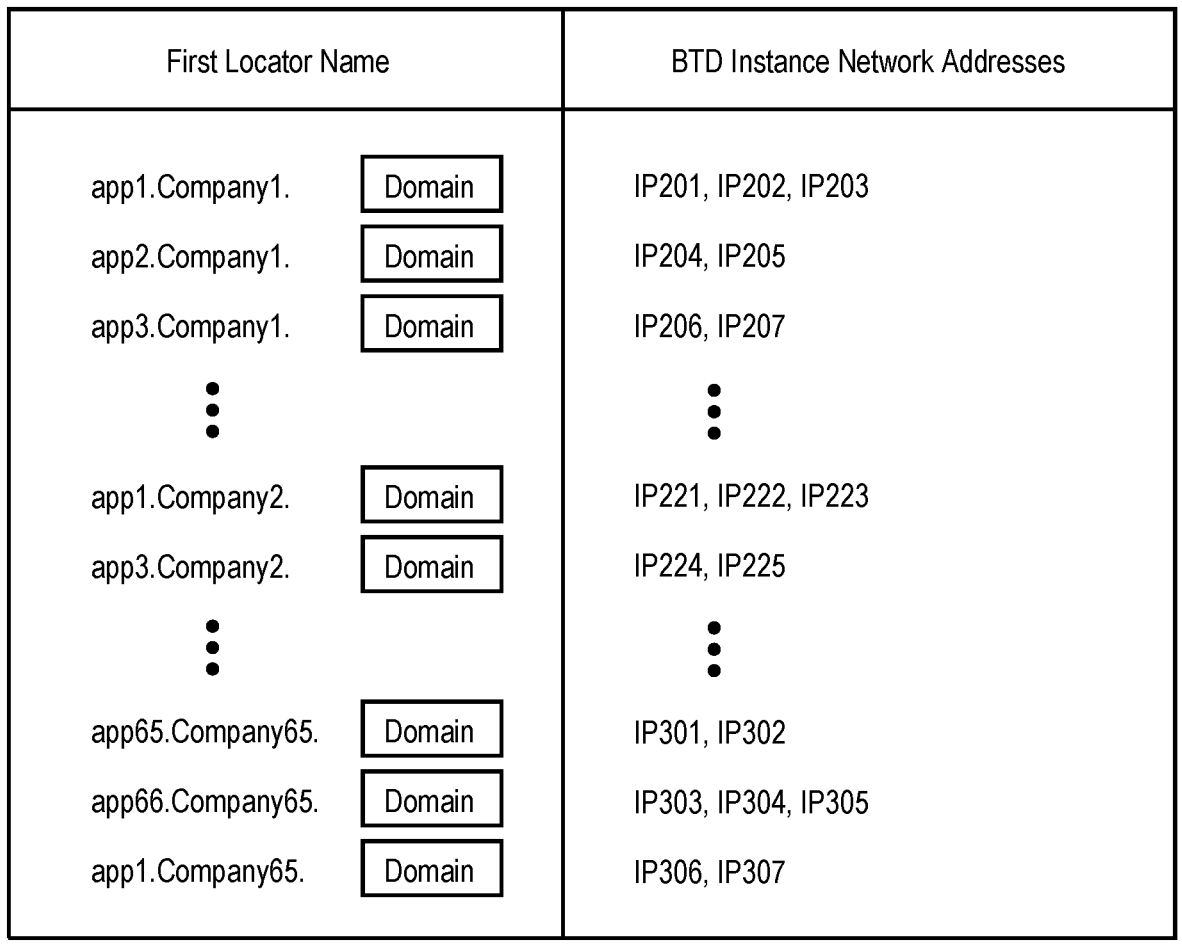
FIG. 4 is an illustrative drawing representing an example first information structure used in the message flow of FIG. 3, which is stored in a non-transitory machine readable storage device in accordance with some embodiments.

FIG. 4 is an illustrative drawing representing an example first information structure 306 of FIG. 3, which is stored in a non-transitory machine readable storage device in accordance with some embodiments. The first information structure 306 associates respective application locator information with respective BTD instances associated with the applications. More particularly, first locator information includes application identifying information and also includes application provider identifying information. The first information structure associates the locator information with network addresses of one or more BTD instances. The application locator information housed in the first information structure 306 can be utilized as a Universal Resource Locator (URL) that the management system 104 has associated the BTD instances and usually consists of an application name-company name combination.

For example, the first information structure 306 associates the first locator, "app1-company1-com.Domain", with the BTD instance network addresses IP201, IP202 and IP203. The locator "app1-company1-com.Domain" identifies the application named, "app1", provided by the provider named "company1". Network addresses IP201 is assigned to a first BTD instance associated with the app1-company1 combination. Network addresses IP202 is assigned to a second BTD instance associated with the app1-company1 combination. Network addresses IP203 is assigned to a third FTD instance associated with the app1-company1 combination. Referring again to FIGS. 3-4, for example, in response to a locator request received from an agent 118 that is requesting a network address corresponding to "app1-company1-com.DOMAIN," the first DNS server 302 selects one of IP201, IP202 and IP203, and sends the selected one as a return to the agent. The agent 118 sends a connection request that uses the returned network address to connect to the BTD instance having that address.

In some embodiments the locator component "Domain" is selected to be descriptive of the provider of the application delivery system 102. For example the component "Domain" may be selected to be "dialin.bubblewrapp.net". In accordance with some embodiments the locator component "Domain" is indicative of the BTD layer 110.

The first DNS server 302 is configured to balance the traffic load on BTD instances. In accordance with some embodiments, the first DNS server 302 uses a round robin process to select among multiple network addresses assigned to an application-provider combination. Referring to the locator name "app1-company1-com.domain" shown in the table structure 306, the first DNS server 302 uses a round robin approach to select among network addresses IP201, IP202 and IP203. In some embodiments, a weighted round robin approach is used in which a network address is selected proportionally with respect to other IP addresses, either using a configured ratio of proportions (e.g. IP201: 25%; IP202: 25%; IP203: 50%), or based on the dynamically changing capacity of the server represented by a given network address.

Figure 5:
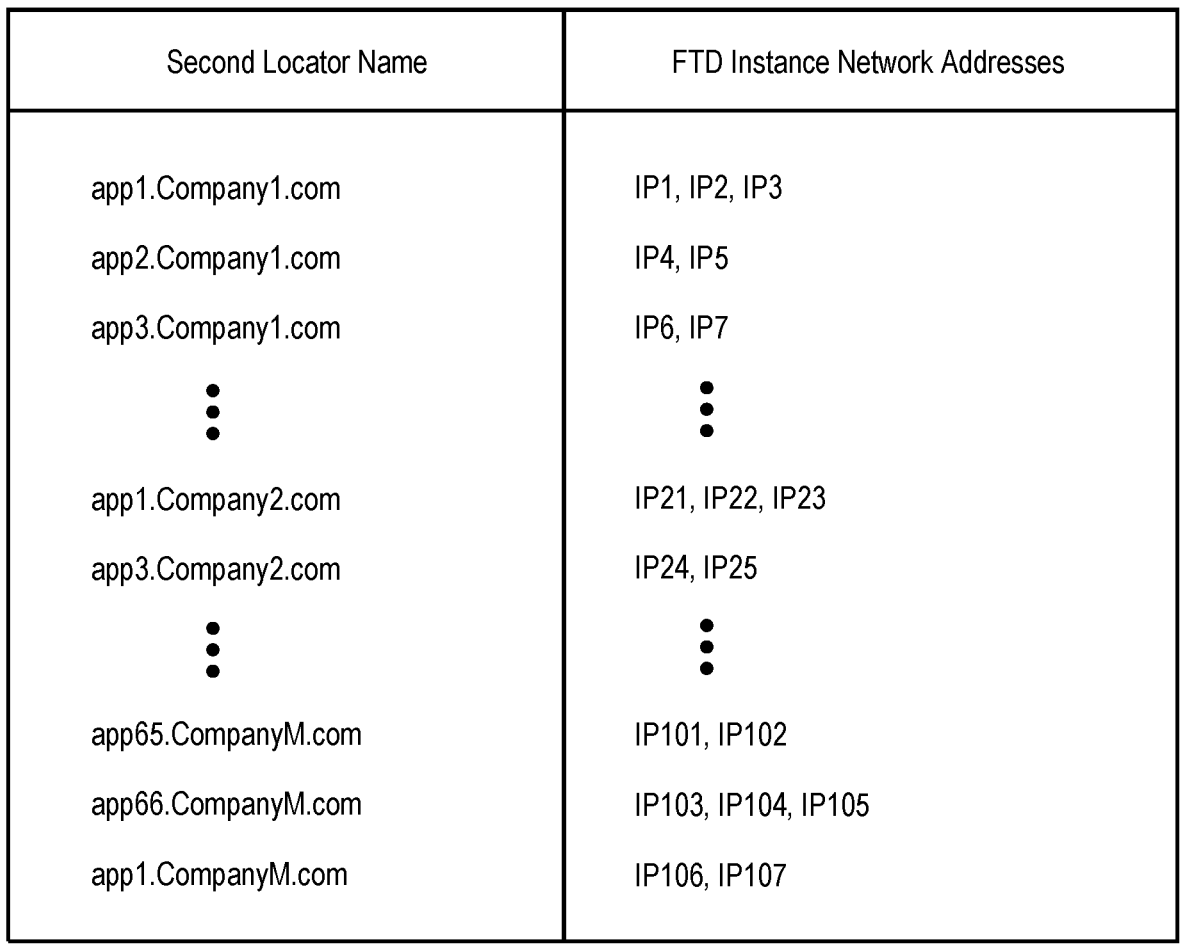
FIG. 5 is an illustrative drawing providing details of a second information structure used in the message flow of FIG. 3, which is stored in a non-transitory machine readable storage device in accordance with some embodiments.

FIG. 5 is an illustrative drawing providing details of the second information structure 310 of FIG. 3, which is stored in a non-transitory machine readable storage device in accordance with some embodiments. The second information structure 310 associates respective application locator information with respective FTD instances associated with the applications. More particularly, second locator information includes application identifying information and also includes application provider identifying information. The second information structure associates the locator information with network addresses of one or more FTD instances. The application locator information housed in structure 310 can be utilized as a Uniform Resource Locator (URL) by an end device and usually consists of an application name-company name combination. A user device 107 may obtain the URL from a web page, for example, that offers access to a corresponding hosted application.

For example, the second information structure 310 associates the second locator, "app1.company1.com", with the FTD instance network addresses IP1, IP2 and IP3. The locator "app1.company1.com" identifies the application named, "app1", provided by the provider named "company1". Network addresses IP1 is assigned to a first FTD instance associated with the app1-company1 combination. Network addresses IP2 is assigned to a second FTD instance associated with the app1-company1 combination. Network addresses IP3 is assigned to a third FTD instance associated with the app1-company1 combination. Referring again to FIG. 5, for example, in response to a locator request received from a user device 107 that is requesting a network address corresponding to "app1.company1.com", the second DNS server 304 selects one of IP1, IP2 and IP3, and sends the selected one as a return to the user device 107. The user device 107 sends a connection request that uses the returned network address to connect to the FTD instance having that address.

It will be appreciated from the second information structure 310 that a single application provider system can host more than one application. For example, the provider named, "company1" hosts applications named app1, app2 and app3. Moreover, it can be seen that different companies can host the same application. For example, the companies named "company1" and "company2" both host the application named "app1". However, the second information structure routes requests for applications on both a per-application and per-provider basis to the right set of FTD instances, which in turn are capable of forwarding these requests onwards correctly and ensure that user or device requests for hosted applications are isolated from each other on a per-application and on a per-provider basis.

The second DNS server 304 is configured to balance the traffic load on FTD instances. In accordance with some embodiments, the second DNS server 304 uses a round robin process to select among multiple network addresses assigned to an application-provider combination. Referring to the locator name "app1.company1.com" shown in the table structure 310, the second DNS server 304 uses a round robin approach to select among network addresses IP1, IP2 and IP3. In some embodiments, a weighted round robin approach is used in which a network address is selected proportionally with respect to other IP addresses, either using a configured ratio of proportions (e.g. IP1: 25%; IP2: 25%; IP3: 50%), or based on the dynamically changing capacity of the server represented by a given network address.

A comparison of the first and second information structures 306 and 310 shows that for each application name-company name combination in the structure 306, there is a corresponding application name-company name combination in the structure 310. Thus, there is symmetry between the two information structures. It will be appreciated that the symmetry between the structures 306 and 310 is used to ensure symmetry of connections to FTD instances and BTD instances that can be stitched together in the TPS layer 112 to provide secure communication paths between user devices and hosted applications in accordance with some embodiments.

Application Agent

Figure 6:
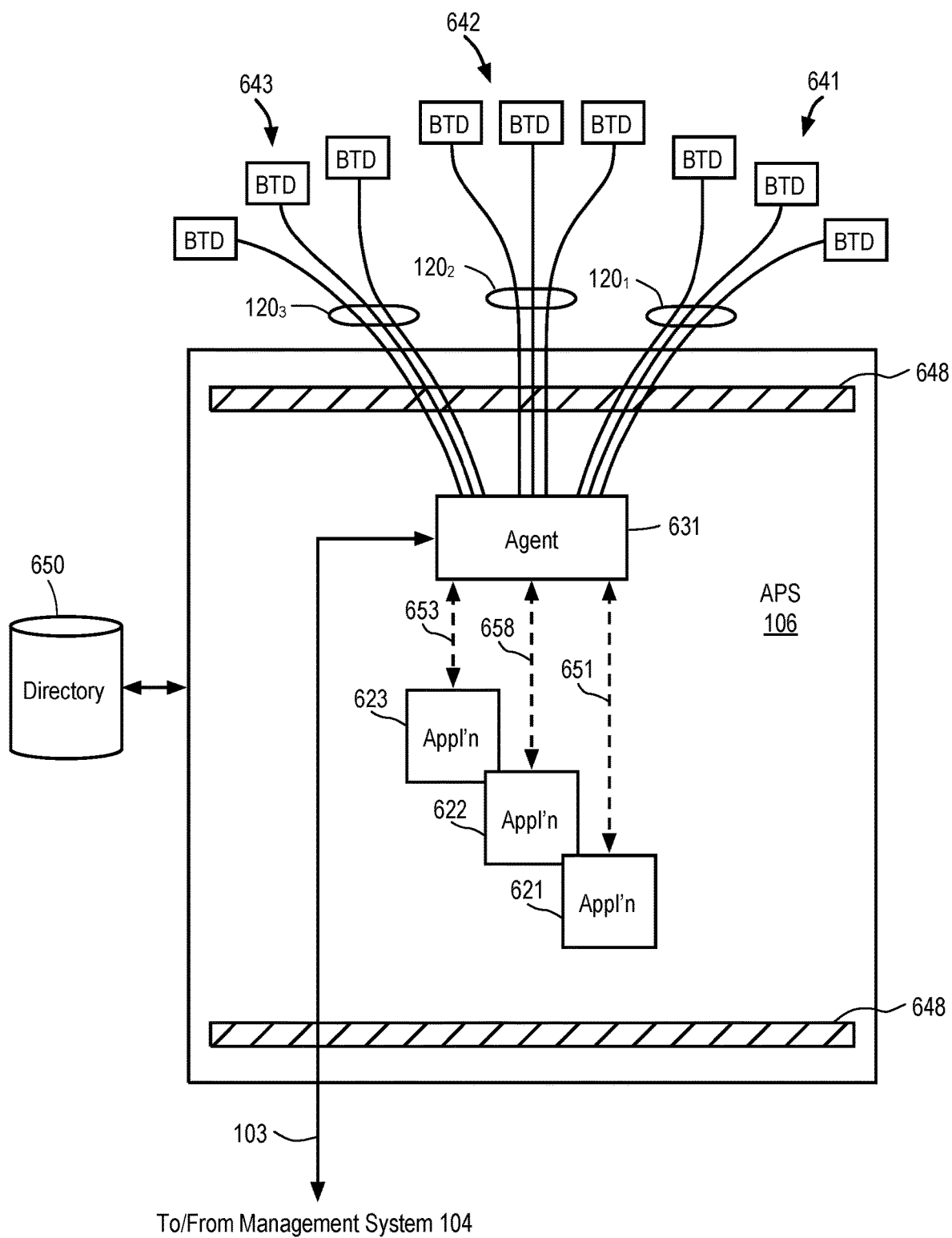
FIG. 6 is an illustrative block diagram showing certain details of an example application provider system having an installed agent and corresponding applications in accordance with some embodiments.

FIG. 6 is an illustrative block diagram showing certain details of an example application provider system 106 configured to include multiple application agents and to host multiple applications in accordance with some embodiments. The example application provider system 106 is configured to host multiple applications 621, 622, 623. That is, the provider system 106 is configured to deliver to user devices the functionality, information or services provided by applications 621-623. The details of the applications are not important and hosting of applications is well known to persons skilled in the art and need not be described. The provider system 106 is configured to run agent 631, which acts as a communication interface between the applications 621-623, respectively, and respective BTD instances (not shown) corresponding to the applications 621-623, respectively. That is, the provider system 106 is configured to execute computer program code to implement the agent 631. A firewall 648 is provided within the application provider system 106 to provide a security barrier between the application provider system 106, which is assumed to be trusted and secure, and the external network 105, which is not assumed to be secure and trusted. The application agent 631 runs within the private system 106 behind the firewall 648. A non-transitory storage device 650 may also be provided to store a directory of user names, which may be accessible to the agents.

The agent 631 creates multiple connections as part of a first dynamic pool of application agent connections $120_1$ between the agent 631 and a first collection of BTD instances 641. The agent 631 creates multiple connections as part of a second dynamic pool of application agent connections $120_2$ between the agent 631 and a second collection of BTD instances 642. The agent 631 creates multiple connections as part of a third dynamic pool of application agent connections $120_3$ between the agent 631 and a third collection of BTD instances 643. The management system 104 provides instructions via path 103 to instruct the agent 631 as to the number of connections in each connection pool and as to the network locations of BTDs to create connections with. The application agent connections cross the firewall 648. Although the example connection pools each connect with different BTDs, it will be appreciated that different connection pools may provide connections between the agent 631 and the same collection of BTDs. These connections in these pools of connections also are referred to as "third" connections in this document.

The agent 631 installed to run within the provider system 106 requests creation of the agent application connection pools $120_1$, $120_2$ and $120_3$. The agent is installed so as to be functionally disposed within the provider system 106 behind the provider system firewall 648. That is, the agent sends a request from within the firewall protected provider system 106 to make connections with BTD instances located outside the firewall protected provider system 106. It can be said that the agent 'dials out' from behind the firewall to connect with a BTDs. The agent makes these connection requests prior to receipt by the application delivery system 102 of user or device requests that use these agent application connections. It will be appreciated that although the agents request creation of connection pools, the management system 104 may determine the number of connections in a given pool and the number of connections may vary over time.

The agent 631 creates internal communication paths between itself and the applications that it manages during user communications with the applications. In particular, the agent 631 creates an additional internal communication path 651 for each user connection arriving at an FTD instance (not shown) that is stitched to one of the agent application connections of the first dynamic pool $120_1$. The agent 631 creates an additional internal communication path 652 for each user connection arriving at an FTD instance (not shown) that is stitched to one of the agent application connections of the second dynamic pool $120_2$. The agent 631 creates an additional internal communication path 653 for each user connection arriving at an FTD instance (not shown) that is stitched to one of the agent application connections of the third dynamic pool $120_3$.

In accordance with some embodiments, a user or device sends encrypted requests to an agent over one of connections $120_1$, $120_2$ or $120_3$. The agent, in turn, sends the request to a requested application over one of communication paths 651, 652 or 653 in the clear or encrypted depending upon the application. If an application supports encryption such as SSL, then the agent encrypts the request using the application's public key and sends the encrypted request to the application. However, if the application does not support encryption, then the agent sends the request to the application without encryption, i.e. in the clear. Since interaction between the agent and application occurs within the provider network, which is considered trusted, it is generally considered safe for the agent to send the request to the application in the clear.

Figure 7:
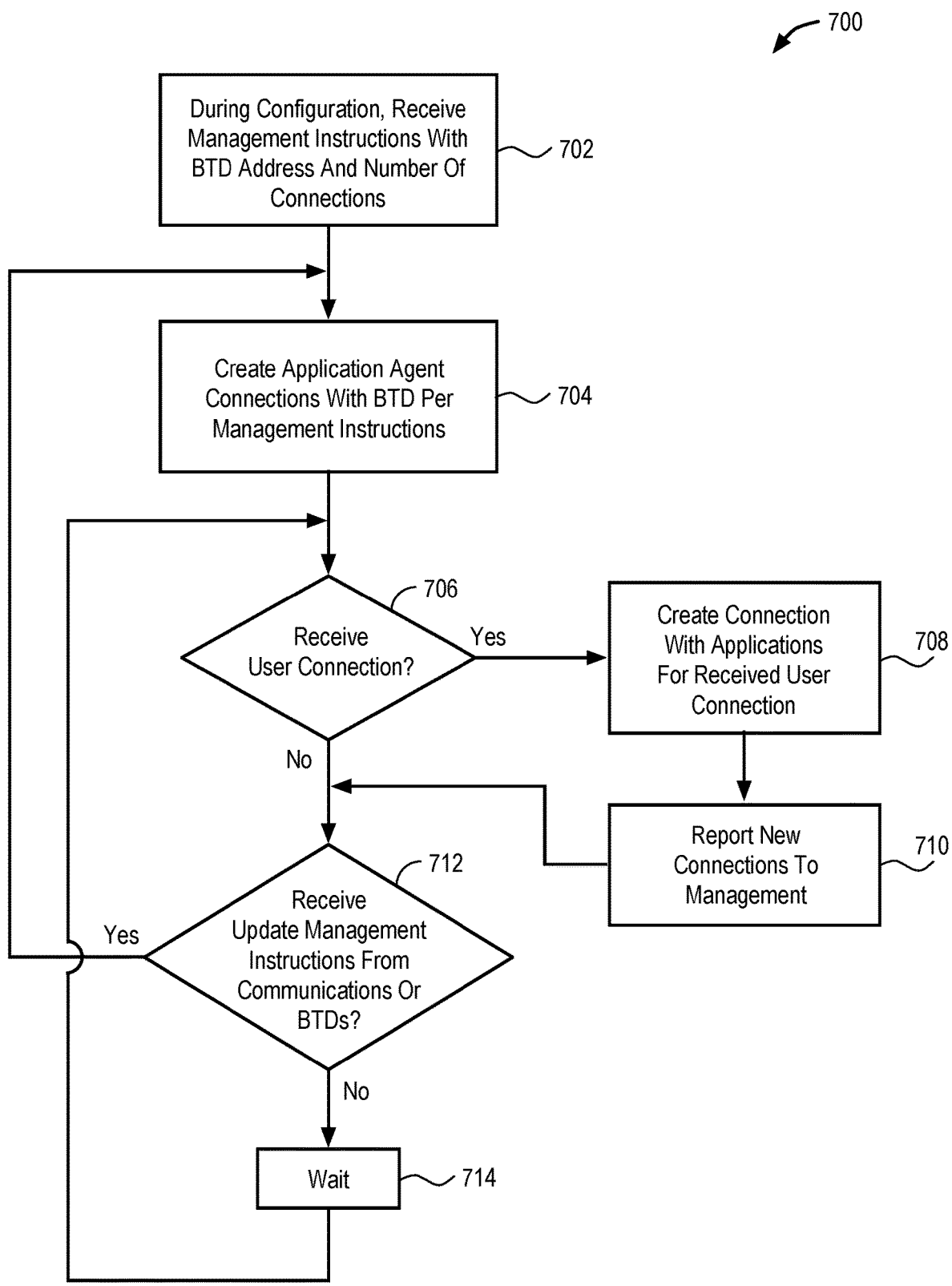
FIG. 7 is an illustrative flow diagram representing an agent process in accordance with some embodiments.

FIG. 7 is an illustrative flow diagram representing an agent process 700 in accordance with some embodiments. It will be appreciated that modules in FIG. 7 represent configuration of the application provider system AA106 according to computer program instructions to perform specified acts. Module 702 is operative during initial configuration to create an initial configuration of an agent and can be operative later to handle configuration changes being made dynamically for a previously configured application or a newly added application. An agent receives from the management system 104 via line 103 over the network 105, information to assign to the agent a different network address (or set of addresses) for each application that it manages. For each application that it manages, the agent also receives from the management system 104 a network address of the one or more BTD instances with which it is to create connections to form a connection pool on behalf of the application. For each application that it manages, the agent also receives from the management system 104 instructions as to the number of network connections in the connection pool to be created on behalf of the application. In accordance with some embodiments, the BTD network addresses may include IP addresses and/or hostnames that are resolvable by the agent, and the application network addresses may include an IP address and/or a hostname that is resolvable by the end agent instance either. As explained above with reference to FIG. 6, each agent acts as an interface between a respective application and BTD instances that are associated with the application.

Module 704 creates the application agent connection pools between an agent and identified BTD instances according to instructions received from the management system 104. More specifically, an agent operative to run the process 700 within the application provider system 106, sends over the 105 network to identified BTD instances, connection requests to create the instructed number of connections per pool with the BTD instances. From the vantage point of the application provider system 106, these requests are outbound requests, sometimes referred to as dial-out requests. In accordance with some embodiments, the application agent connections consist of secure connections, e.g., HTTPS connections. In accordance with some embodiments, since the application agent connection requests are outbound from the secure trusted application provider system 106 to the BTD instances, the firewall 648 ordinarily does not block the connections. In the case of HTTPS connections, for example, the firewall 648 ordinarily does not block the connections because the connections are created using the HTTPS protocol, typically traverse a standard port (443) and are compliant to all industry-standard protocol definitions. The details of the protocol are not important and are well known to persons skilled in the art and need not be described. It is noted that the application agent connections are created independent of user or device requests for access to the application.

Decision module 706, which is operative in each agent configured within an application provider system 106, monitors each application agent connection to determine whether a user or device request is received over the connection. It will be appreciated that in operation, the TPS layer 112 stitches together user or device requests received at the FTD layer 108 for access to applications associated with the BTD layer 110. More specifically, for example, the TPS layer 112 stitches together a user device connection to an FTD instance in the FTD layer 108 with a pre-created application agent connection to a BTD instance in the BTD layer. Once the stitching is complete, a user or device request can be sent over the network 105 from the stitched in application agent connection to an agent. Decision module 706 monitors each application agent connection for receipt of such user or device request over one of its application agent connections. In response to receipt of a user or device request over a monitored application agent connection, module 708 creates a corresponding internal connection, within the application delivery system AA106, to an application associated with the agent. In accordance with some embodiments, the internal connection may be of type HTTP, HTTPS, or a variety of other network communications protocols that may be in use by the application. Thus, it will be appreciated that a logical connection can be created that includes a user device connection to an FTD instance and that includes a stitching by a TPS instance to an application agent connection between a BTD instance and an agent and that includes a connection between the agent and an application hosted within a host provider system.

Module 710 reports the creation of the internal connection to the management system 104 over the network 105 via line 103. The management system 104, specifically the policy optimization subsystem 113 monitors and evaluates operation of each agent based in part upon number of internal connections created. The orchestration system 114 may send instructions over the network via line 103 to an agent to increase or to reduce the number of BTD connections for a given application based upon the evaluation by subsystem 113. Such instructions may include additional network addresses at which to make new connections. It will be appreciated that during operation, the management system 104 monitors system load such as, traffic volume for a given application and overall system performance such as CPU usage. As traffic volume varies for the given application, the management system 104 may determine that more or fewer application agent connections are required between a given application and an agent or to add or terminate one or more connections with one or more BTD instances associated with the given application. Also, as traffic volume and/or CPU usage and perhaps other system-wide characteristics vary, the management system may determine to add or terminate BTD instances.

In response to decision module 706 determining that no new user or device request has been received or in response to module 710 reporting a new internal connection to the management system 104, control flows to decision module 712. Decision module 712 determines whether updated instructions have been received by the agent from the management system 104 instructing the agent to change the number of application agent connections with one or more BTD instances or to create new application agent connections with a newly added BTD instance. Instructions to create application agent connections with a newly added BTD instance include a network address for the newly added BTD. In response to a determination by decision module 712 that instructions have been received to update application agent connections, control flows back to module 704. In response to a determination by decision module 712 that instructions have not been received to update application agent connections, there may be a temporary wait 714 followed by control flow back to decision module 706.

It will be appreciated that each pre-created connection of the connection pools, 120₁-120₃ can be stitched to a connection carrying a user or device request and that each internal connection 651-653 is created in response to a user or device request received over an application agent connection. An application agent connection together with an internal connection created in response to a request received over the application agent connection, therefore, constitute part of a logical path through the application delivery system 102 to a user device making the request. It will be appreciated that since the logical path uses a pre-created application agent connection that already has gained passage through the firewall 648, a newly received user or device request ordinarily is not blocked by firewall rules. It will further be appreciated that in effect, a number of firewall and related policy processing functions for the application are now being carried out by the application delivery system 102 for each end user attempting to access the application, and that this is being carried out generally without making any material changes to the firewall or to any network policies within the application provider system.

Connections Between End-User Device, FTD Layer and TPS Layer

Figure 8:
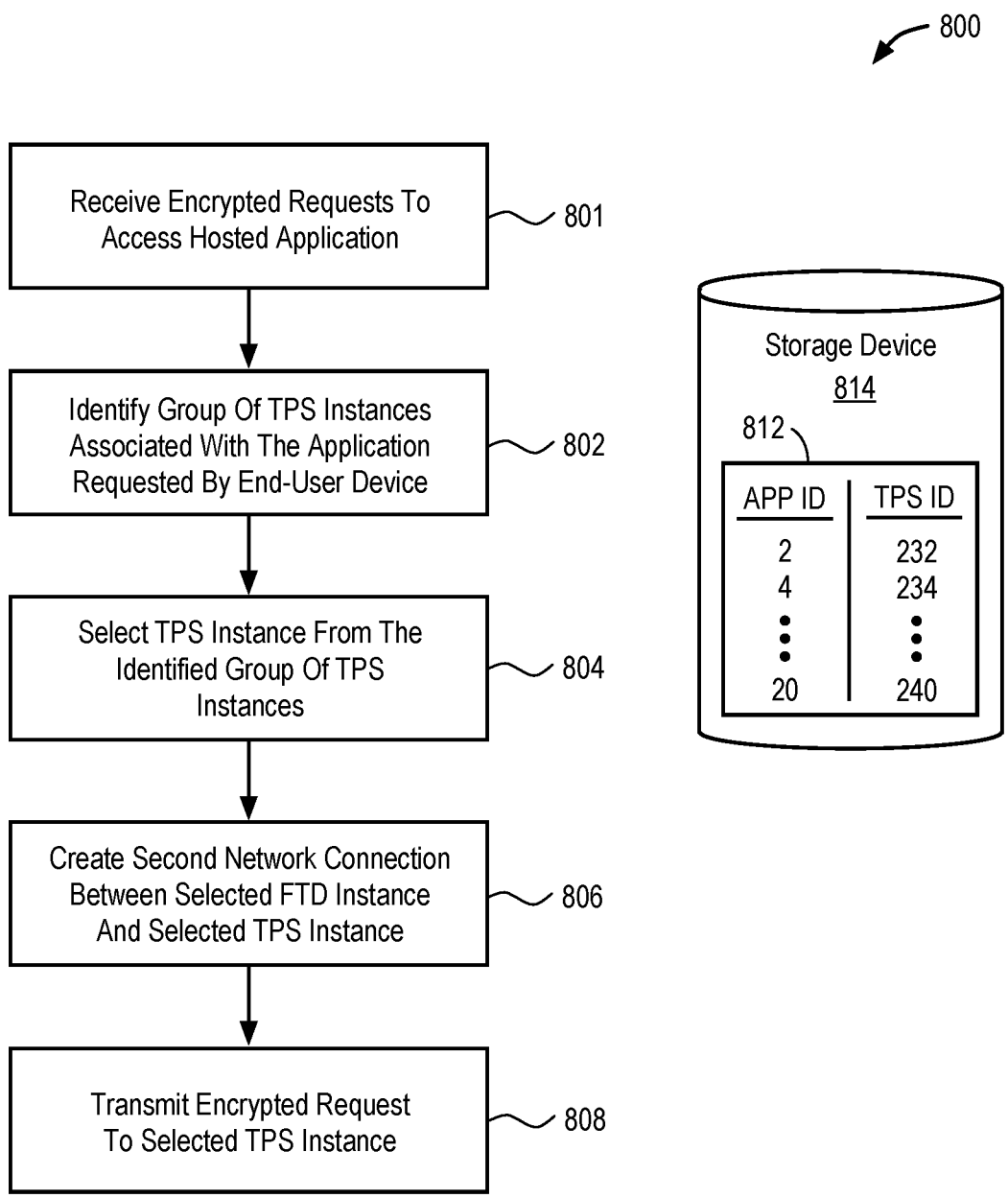
FIG. 8 is an illustrative flow diagram representing a process of operation of an FTD instance to select a TPS instance to service an end-user or device request for access to an application in accordance with some embodiments.
Figure 9:
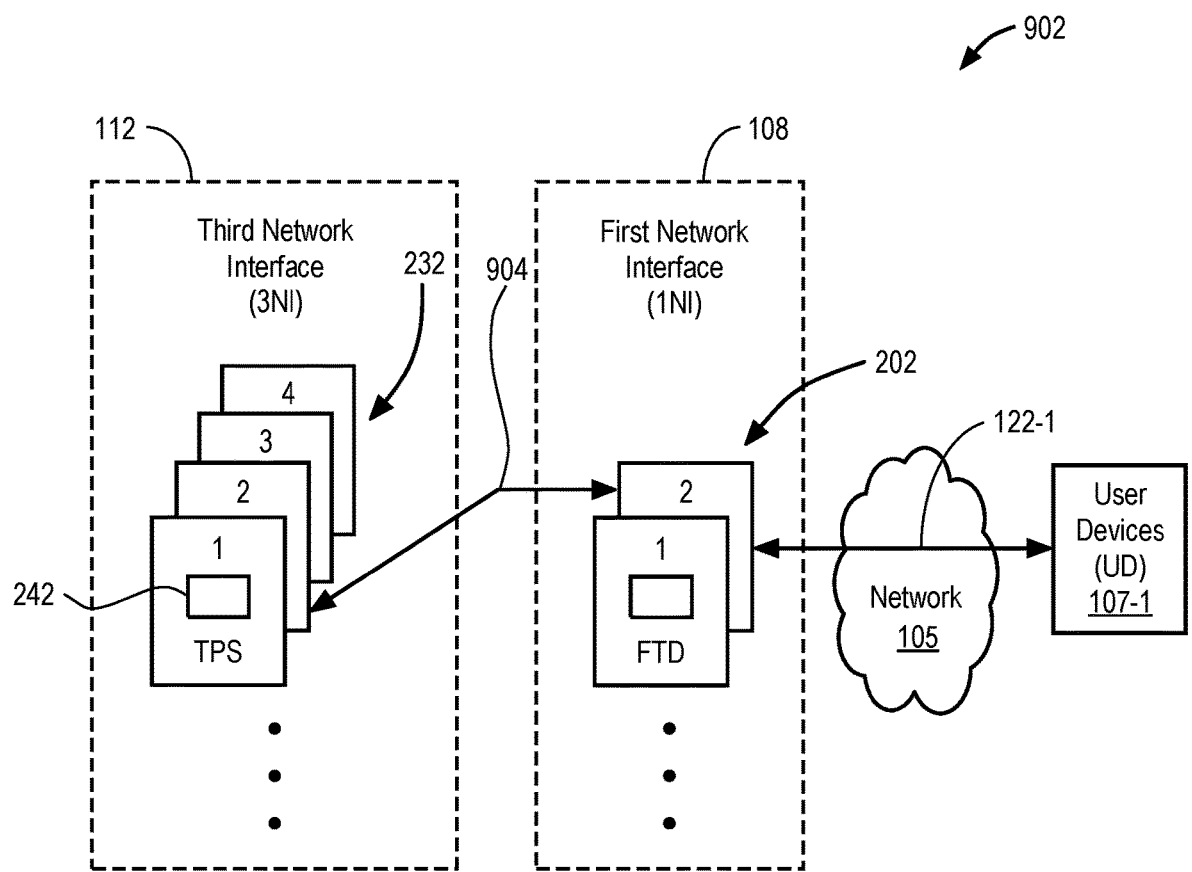
FIG. 9 is an illustrative drawing showing a portion of an application delivery system shown in FIG. 2 that includes a communication path between an FTD instance and a TPS instance in accordance with some embodiments.

FIG. 8 is an illustrative flow diagram representing a process 800 of operation of an FTD instance to select a TPS instance to service an end-user or device request for access to an application in accordance with some embodiments. FIG. 9 is an illustrative drawing showing a portion 902 of the application delivery system 102 shown in FIG. 2 that includes a "second" communication path 904 between an FTD instance (2) the first FTD group 202 and a TPS instance (2) within the second TPS group 232 in accordance with some embodiments. Assume, for example, that the second DNS server 304 directs a user or device request to FTD instance (2) from the first FTD group 202, and the first network communication path 122-1 shown in FIG. 1 and FIG. 9 is created between end-user device 107-1 and that selected FTD instance (2). The FTD instance may be selected according to the DNS process described above with reference to FIG. 5. Module 801 receives an encrypted user or device request over the first network connection 122-1. In accordance with some embodiments, an information structure 812 stored in a non-transitory storage device 814 associates application/provider identifiers (A/P IDs) with network addresses of TPS instances of a group of one or more TPS instances. In accordance with some embodiments, the TPS instance network addresses include IP addresses. For example, the illustrative table information structure 812 associates the application with APP ID "2" with the group of TPS instances that are identified in FIG. 2 and FIG. 5 with the reference number "232". Alternatively, the information structure 812 can be implemented to associate application identifiers with network addresses of TPSs, for example, if a corresponding FTD is configured to receive requests on behalf of a single provider; in that case provider information is unnecessary in the information structure 812.

It will be appreciated that the management system 104 directs the creation of the information structure 812 and updates its content as necessary as TPS instances are created and removed, for example. As explained herein, the number of TPS instances associated with a hosted application is scalable and can vary over time depending upon factors such as traffic load and performance requirements, for example. The management system 104 controls the number of TPS instances associated with a hosted application. The management system keeps the information structure 812 up to date with the current number of TPS instances associated with a given hosted application.

Module 804 configures a processor within the system 102, for example by executing a worker process, to use information structure 812 associated with the selected FTD instance (2) from the first FTD group 202 to select a TPS instance from among the identified group associated with the requested hosted application. In some embodiments, a TPS instance from the group is selected based upon a traffic load balancing process that aims to balance the number of connections between a selecting FTD and a group of TPS instances associated with the requested hosted application. In some embodiments, a weighted round robin distribution method is used, with the weight depending on activity metrics collected from each TPS instances, for example. It will be appreciated that in accordance with some embodiments an FTD instance may handle hundreds of thousands of network connections simultaneously. Moreover, a TPS instance may be associated with multiple different FTD instances, each of which may independently request internal connections to it. Thus, load balancing of FTD connections to TPS instances contributes to traffic flow management as does scaling of the number of FTD instances and TPS instances based upon traffic load.

Module 806 configures the selected FTD instance to create a network communication path between the selected FTD instance and the selected TPS instance. Referring again to FIG. 9, assume for example, that TPS instance (2) from the first TPS group 232 is selected. In that case, module 806 configures the selected FTD instance to create the network communication second connection 904 between itself and TPS instance (2) from the first TPS group 232. Module 808 transmits the encrypted request over the second network communication path 904 to the selected TPS instance.

It will be appreciated that user device "first" network connections 122-1 to 122-N to the application delivery system 102 terminate with the FTD layer 108. Specifically, for example, the example first network connection 122-1 terminates at FTD instance (2) from the first FTD group 202. Moreover, requests are not decrypted within the FTD layer 108. Thus, security is enhanced since user or device requests are not decrypted at the "edge" of the application delivery system 102 that faces the untrusted network 105. For each user or device request for a hosted application received on an external network facing side of an FTD instance, a receiving FTD instance creates a corresponding internal request over an additional, internal network communication path to a TPS instance for the requested hosted application. The TPS instance receiving the request over that internal connection decrypts the request for processing. Thus, encryption does not occur at the external facing "edge" of the application delivery system 102.

Connections Between Application Agent, BTD Layer and TPS Layer

Figure 10:
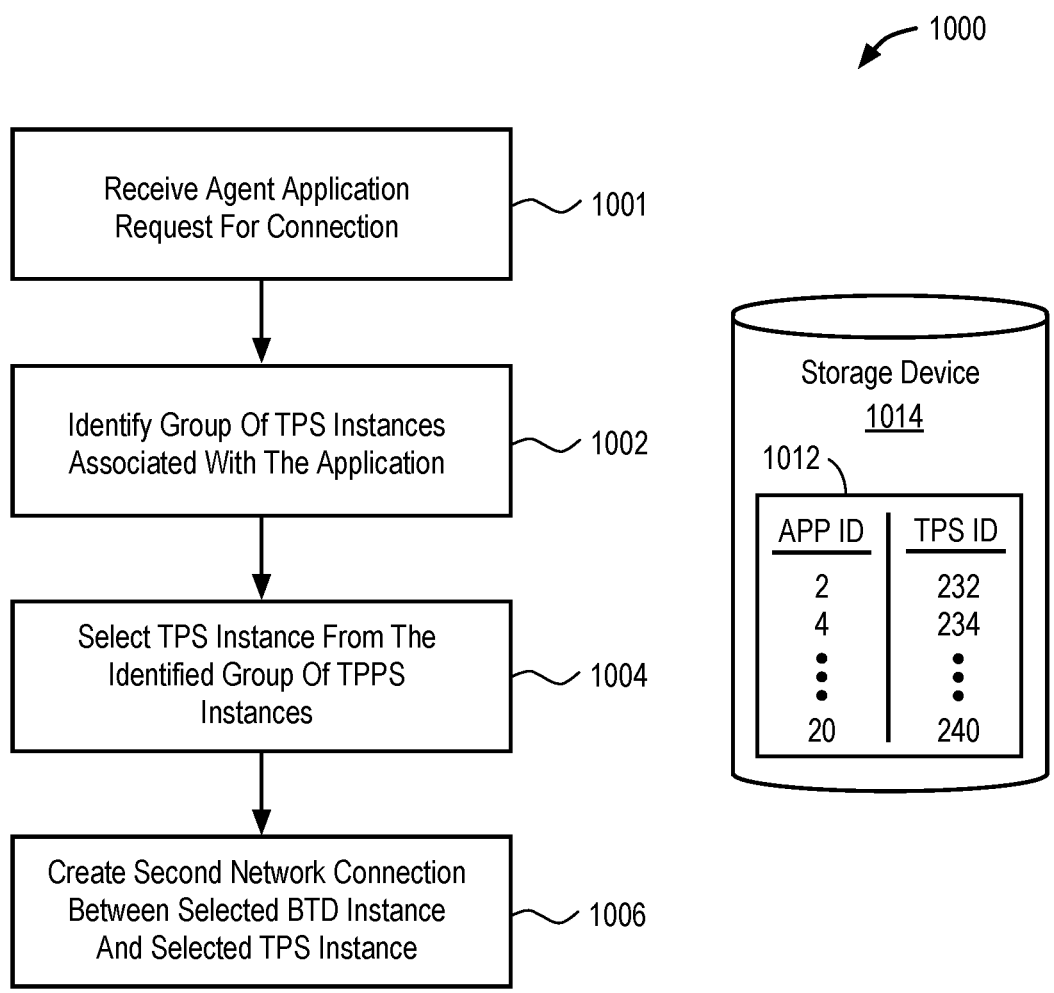
FIG. 10 is an illustrative flow diagram representing a process of operation of a BTD instance to select a TPS instance to service an agent application request for connection in accordance with some embodiments.
Figure 11:
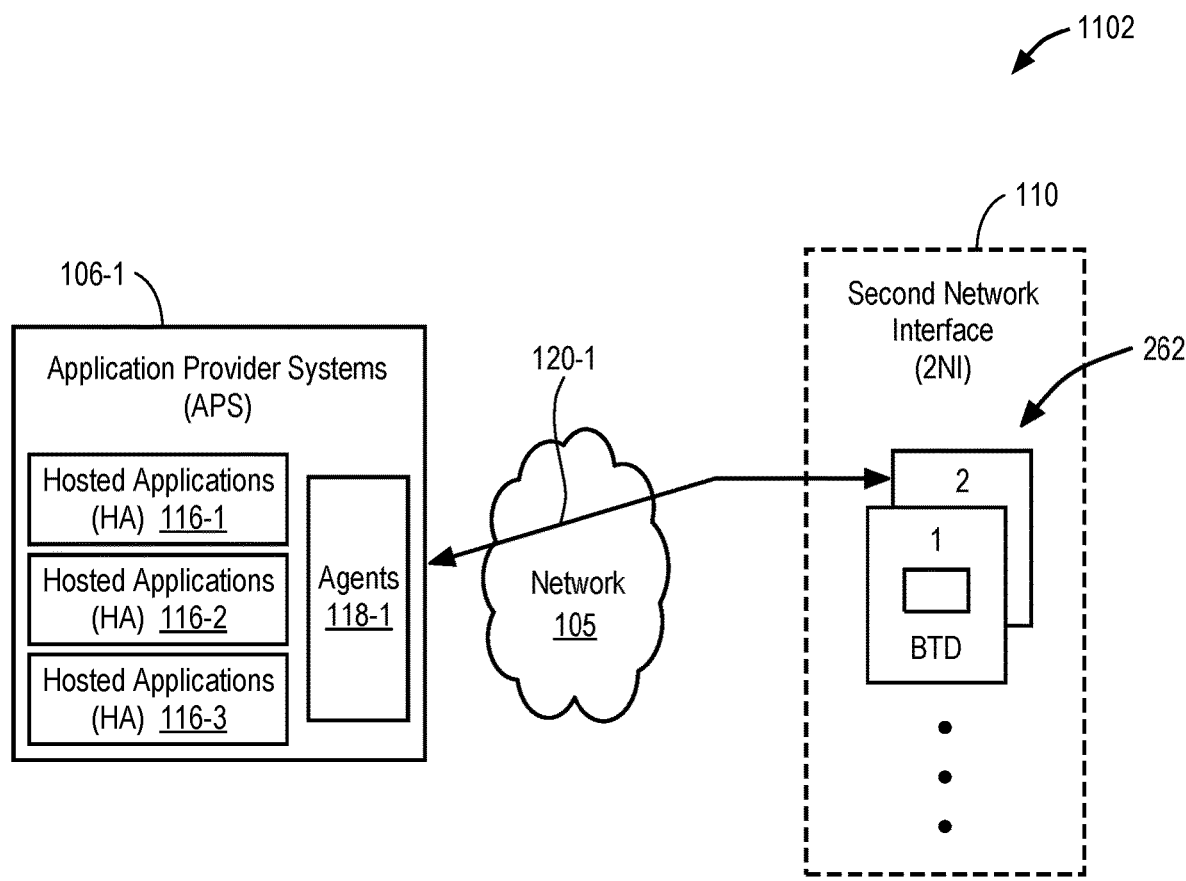
FIG. 11 is an illustrative drawing showing a portion of the application delivery system shown in FIG. 2 that includes a dynamic pool of pre-configured network connections between a BTD instance and an agent within an application provider system in accordance with some embodiments.
Figure 12:
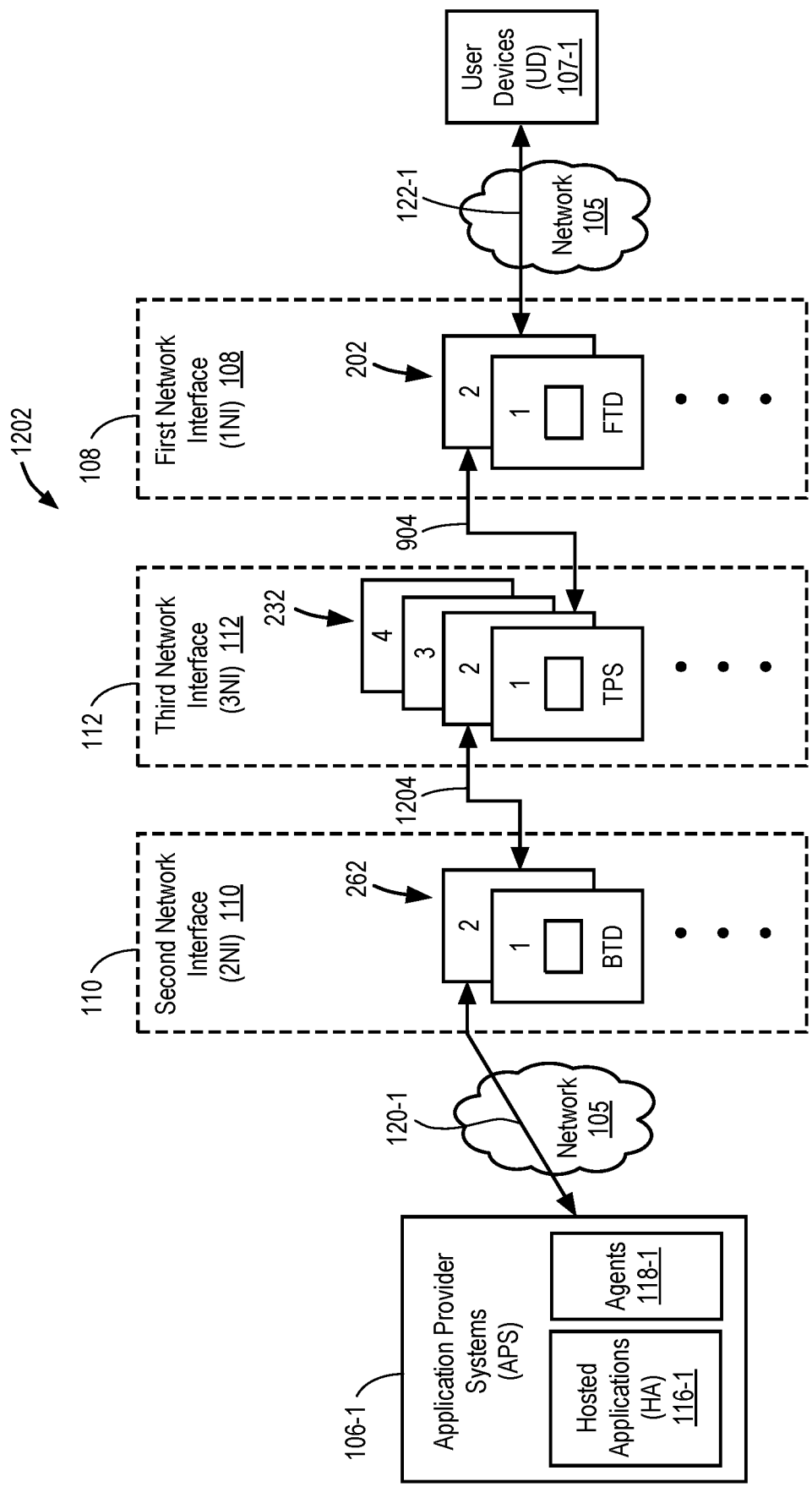
FIG. 12 is an illustrative drawing that shows a portion of the application delivery system shown in FIG. 2 that encompasses that encompasses the portions of FIG. 8 and FIG. 11 in accordance with some embodiments.

FIG. 10 is an illustrative flow diagram representing a process 1000 of operation of a BTD instance to select a TPS instance to service an agent application request for connection in accordance with some embodiments. FIG. 11 is an illustrative drawing showing a portion 1102 of the application delivery system 102 shown in FIG. 2 that includes a pool of pre-configured "third" network connections 120-1 between a BTD instance and an agent 118-1 within an application provider system 106-1 in accordance with some embodiments. FIG. 12 is an illustrative drawing that shows a portion 1202 of the application delivery system 102 that encompasses FIG. 8 and FIG. 11 and that shows the entire communication path between a user device 107-1 and an agent 118-1, a path that encompasses path segments between a user device 107-1 and an FTD layer 108, a path between the FTD layer 108 and a TPS layer 112, a path between the TPS layer 112 and a BTD layer 110, and a path between the BTD layer 110 and an agent 118-1 in accordance with some embodiments. The operation process 600 of FIG. 10 shall be explained with reference to illustrative example network connection shown in FIG. 11 and FIG. 12.

Referring now to FIG. 10, module 1001 configures the BTD instance running the process 1000 to receive an application agent request received over the external network 105. The BTD instance may be selected according to the process described above with reference to FIG. 3 and FIG. 4. Module 1002 configures the BTD instance that receives the application agent request to create a network communication path between the selected BTD instance and a TPS instance. Referring to the example portion shown in FIG. 11, assume that a dynamic pool of preconfigured third connections 120-1 is created between the agent 118-1 and the BTD instance (2) from the first BTD group 262 in response to a request from the agent 118-1 for a hosted application 116-1. Now, continuing with the example from FIG. 9, module 1002 configures a processor, for example by executing a worker process, within the system 102 to identify a group of one or more TPS instances that are associated with a hosted application identified in the application agent request that resulted in connections within the connection pool 120-1. In accordance with some embodiments, an information structure 1012 stored in a non-transitory storage device 1014 associates application/provider identifiers (A/P IDs) with network addresses of TPS instances of a group of one or more TPS instances. For example, the illustrative table information structure 1012 associates the application with APP ID "2" with the network addresses of the TPS instances identified in FIG. 2 with the reference numeral "232". In accordance with some embodiments, the TPS instance network addresses include IP addresses. Alternatively, the information structure 1012 can be implemented to associate application identifiers with network addresses of TPSs, for example, if a corresponding BTD is configured to receive requests on behalf of a single provider; in that case provider information is unnecessary in the information structure 1012.

As a result, a pool of agent third connections 120-1 is created between a requesting agent and a BTD instance. For each agent connection in the pool 120-1, a corresponding associated connection is created between the BTD instance and a TPS instance. Thus, in accordance with some embodiments there is a one-to-one relationship between respective connections between an agent and a BTD instance and respective connections between that BTD instance and one or more TPS instances. As a result, a user or device request sent over a connection between a TPS instance and a BTD instance can be transmitted by the BTD instance over the associated connection between the BTD instance and the agent that requested the connection to the BTD instance.

It will be appreciated that the management system 104 directs the creation of the information structure 812 and updates its content as necessary as TPS instances are created and removed, for example. As explained herein, the number of TPS instances associated with a hosted application is scalable and can vary over time depending upon factors such as traffic load and performance requirements, for example. The management system 104 controls the number of TPS instances associated with a hosted application. The management system keeps the information structure 1012 up to date with the current number of TPS instances associated with a given hosted application.

Continuing with the example, module 1004 configures a processor within the system 102 to use information structure 1012 associated with the selected BTD instance (2) from the first BTD group 262 to select a TPS instance from among the identified group associated with the requested hosted application. In some embodiments, a TPS instance from the group is selected based upon a traffic load balancing process that aims to balance the number of connections between a selecting BTD and the TPS instances of a group of TPS instances associated with a selected hosted application. In some embodiments, a weighted round robin distribution method is used, with the weight depending on activity metrics collected from each TPS instances, for example. It will be appreciated that in accordance with some embodiments a BTD instance may handle hundreds of thousands of network connections simultaneously. Moreover, a TPS instance may be associated with multiple different BTD instances, each of which may independently request internal connections to it. Thus, load balancing of BTD connections to TPS instances contributes to traffic flow management as does scaling of the number of BTD instances and TPS instances based upon traffic load.

Module 1006 configures the selected BTD instance to create a network communication path between the selected BTD instance and the selected TPS instance. Referring to FIG. 12, for example, module 1006 may cause the creation of a "fourth" network connection 1204 between a selected BTD instance (2) of the first BTD group 262 and a selected TPS instance (2) of the first TPS group. It will be appreciated that fourth connection 1204 is associated with and has a one-to-one relationship with one of the connections from the pool of connections 12-1.

It will be appreciated that dynamic pools of pre-configured application agent network third connections 120-1 to 120-N terminate with the BTD layer 110. Specifically, for example, a third network connection from a first pool 120-1 terminates at BTD instance (2) of the first BTD group 262. Moreover, requests are not decrypted within the BTD layer 108. Thus, security is enhanced since packets transmitted over the application agent network connections are not decrypted at the "edge" of the application delivery system 102 that faces the untrusted network 105. For each application agent network connection over the external network 105 facing side of a BTD instance, a BTD instance making the external facing connection creates a corresponding internal network communication path to a TPS instance. The TPS instance on that internal network connection decrypts the request for processing. Thus, encryption does not occur at the external facing "edge" of the application delivery system 102.

TPS Layer Services

The TPS layer 112 performs stitching of "second" FTD connections with "fourth" BTD connections, provides validity checking and also may also provide additional services.

TPS Layer Stitching Services

As an overview, referring again to FIG. 12, users or devices request a first network connection e.g., 122-1 with FTD instances of the FTD layer 108. FTD instances of the FTD layer 108 request second connections, e.g., 904, with the TPS instances of the TPS layer. Agents request a pool of third connections, e.g., 120-1, with BTD instances of the BTD layer 110. BTD instances of the BTD layer 110 request fourth connections, e.g., 1204, with TPS instances of the TPS layer 112. The management system 104 determines the first, second, third and fourth connections. The TPS layer stitches together fourth connections and second connections to complete end-to-end connection between devices and hosted applications.

Figure 13A:
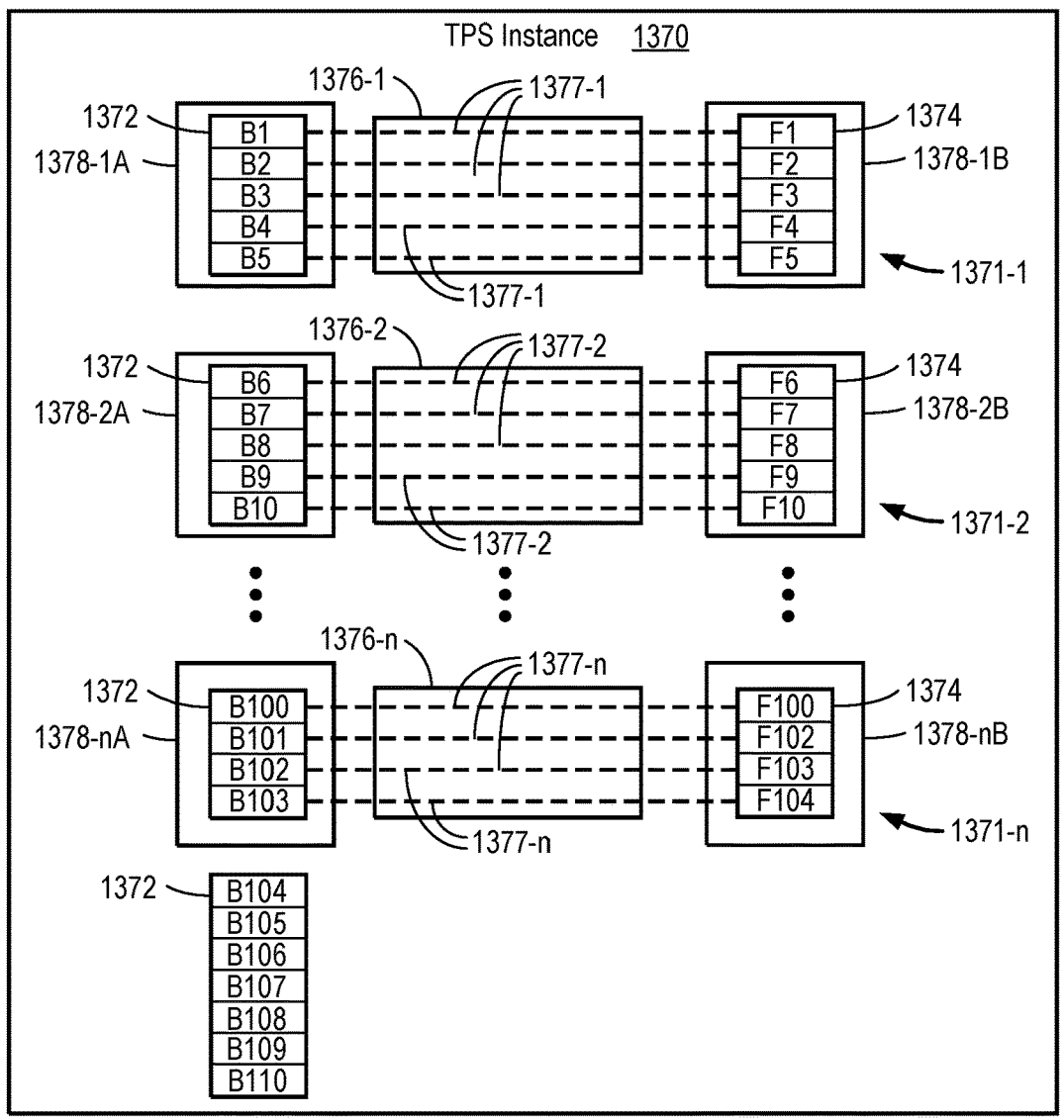
FIG. 13A is an illustrative functional block diagram representing configuration of an example TPS instance in accordance with some embodiments.

FIG. 13A is an illustrative functional block diagram representing configuration of an example TPS instance 1370 in accordance with some embodiments. It will be understood that a TPS instance may be implemented using one or more processors and logic circuits, for example. The TPS instance 1370 includes a plurality of 'fourth' network connection endpoints 1372, identified as B1 to B110, with one or more BTD instances (not shown). The TPS instance 1370 includes a plurality of 'second' network connection endpoints 1374, identified as F1 to F10, with one or more FTD instances (not shown). Stitching modules 1371-1 to 1371-n are created and terminated dynamically as needed. The stitching modules 1371-1 to 1371-n include processing workers 1376-1 to 1376-n and queues 1378-1A to 1378-nB, which are used to selectively connect individual fourth connection endpoints to associated individual second connections over the physical connection endpoints.

Persons skilled in the art will appreciate that each fourth network connection endpoint and each second network connection endpoint includes one or more information structures that are stored in a non-transitory storage device (not shown), and are used to manage the flow of information over its corresponding connection. In particular, for example, each connection endpoint includes a storage buffer allocated from a storage device for use to transmit and receive information over its corresponding connection. Connection endpoints are well known to persons skilled in the art and need not be described herein.

Processing workers are configured to communicate information between fourth connection endpoint buffers and associated second connection endpoint buffers. More particularly, in accordance with some embodiments, the TPS instance 1370 associates individual fourth connection endpoints with individual second connection endpoints to define individual stitched connections. Each individual stitched connection between a fourth connection endpoint and a second connection endpoint is assigned to an individual processing worker. Stitched connections are represented in FIG. 13A as dashed lines within processing workers 1376-1 to 1376-n.

The processing worker 1376-1 is shared among endpoints B1-B5 and endpoints F1-F5. The processing worker 1376-1 is utilized to communicate information between the fourth network connection endpoints B1-B5 and associated second network connection endpoints F1-F5. In the illustrative TPS instance 1370, fourth endpoint connection endpoint B1 is associated with second connection endpoint F1; endpoint B2 is associated with endpoint F2; endpoint B3 is associated with endpoint F3; endpoint B4 is associated with endpoint F4; and endpoint B5 is associated with endpoint F5. During normal operation, at any moment one associated pair of endpoints is physically coupled to communicate information over one or more physical conductor paths, indicated by dashed lines 1377-1, of the processing worker 1376-1, which is shared among endpoints B1-B5 and endpoints F1-F5. Thus, stitching includes sharing one or more physical paths, indicated by dashed lines 1377-1, between associated endpoint pairs such that at any given moment, one of the associated pairs sharing the one or more physical paths is physically coupled to communicate information over the one or more paths. At a different moment, for example, a different associated pair may be coupled to communicate information over the path.

Likewise, the fourth endpoint connection endpoint B6 is associated with second connection endpoint F6; endpoint B7 is associated with endpoint F7; endpoint B8 is associated with endpoint F8; endpoint B9 is associated with endpoint F9; and endpoint B10 is associated with endpoint F10. The processing worker 1376-2 is utilized to communicate information between associated endpoints B6 and F6, or B7 and F7, or B8 and F8, or B9 and F9, or B10 and F10.

The illustrative example TPS instance includes a greater number of fourth endpoints than second endpoints. For example, fourth endpoints B104-B110 have not yet been associated with corresponding second endpoints. Recall that one or more agents request pools of third connections to one or more BTD instances, which in turn, request one or more fourth connections with one or more TPS instances. As a result, a sufficiently large pool of fourth connections is created with the example TPS instance 1370 such that upon the arrival of a new second connection, an open fourth connection is available (i.e. one that has not already been associated with a second connection) for association with the newly arrived second connection. A new processing worker may be created dynamically to stitch a newly arrived second connection to an existing fourth connection, or the newly the newly arrived second connection and a newly associated associated connection may be added to the respective second and first queues of an existing worker process, for example.

Each processing worker is associated with a group of associated (i.e. paired) fourth and second connection endpoints, in accordance with some embodiments. The example first processing worker 1376-1 is associated with five endpoint pairs: (B1, F1), (B2, F2), (B3, F3), (B4, F4) and (B5, F5). In an actual use, each processing worker may be associated with 100 endpoint pairs, for example. Moreover, in actual use a TPS instance may include 100s of processing workers, each serving up to 100 endpoint pairs, for example.

In accordance with some embodiments, stitching modules 1371-1 to 1371-n and corresponding processing workers are implemented using one or more processors, or software processes or threads, to implement shared worker behavior. For example, a processor may associate a group of endpoint pairs with a processing worker. The fourth connection endpoints in the group are placed in a first queue e.g., 1378-1A in the processing worker, and the second connection endpoints in the group are placed in a second queue e.g., 1378-1B in the processing worker. Each associated pair in the group waits its turn in the first and second queues, 1378-1A, 1378-1B, to transfer information to each other. For example a first queue 1378-1A associated with the first processing worker 1376-1 includes endpoints B1-B5, and a second queue 1378-1B associated with the first processing worker 1376-1 includes endpoints F1-F5. The processor couples each associated pair in order to the shared conductor 1376-1: (B1, F1), followed by (B2, F2), followed by (B3, F3), followed by (B4, F4), followed by (B5, F5), and then repeat, for example. Thus, in some embodiments, a processor implements a processing worker.

Figure 13B:
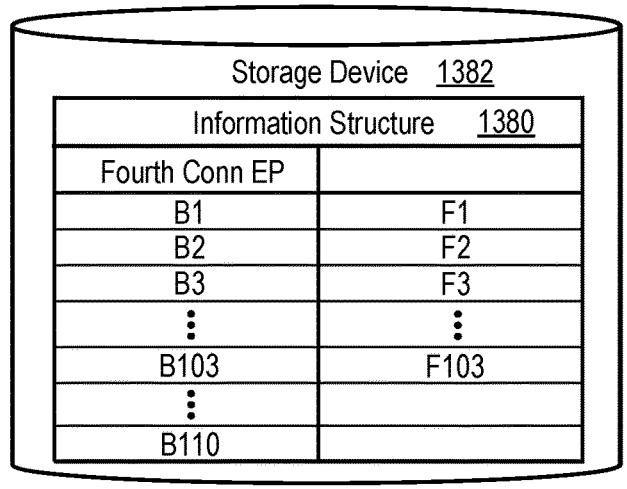
FIG. 13B is an illustrative information structure stored in a non-transitory computer readable storage device that associates fourth connection endpoints with second connection endpoints in accordance with some embodiments.

FIG. 13B is an illustrative information structure 1380 stored in a non-transitory computer readable storage device 1382 that associates fourth connection endpoints with second connection endpoints in accordance with some embodiments. The example information structure 1380 includes a table that is associated with an application/provider combination (e.g. App XYZ, Company ABC). The table associates fourth connection endpoints B1 to B103 with second connection endpoints F1 to F103, for example. The table may indicate further information such as the storage locations within the example TPS instance 1370 associated with each endpoint. The storage location information can be useful in coupling endpoint s to physical conductor lines, for example.

Figure 13C:
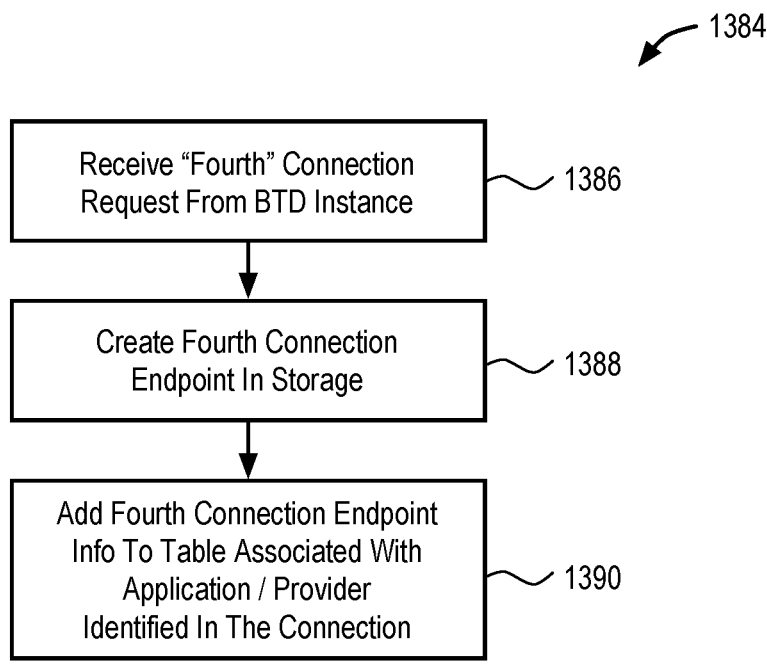
FIG. 13C is illustrative flow diagram representing a process using fourth connection request information received from a BTD instance to contribute to the creation of the information structure of FIG. 13B in accordance with some embodiments.
Figure 13D:
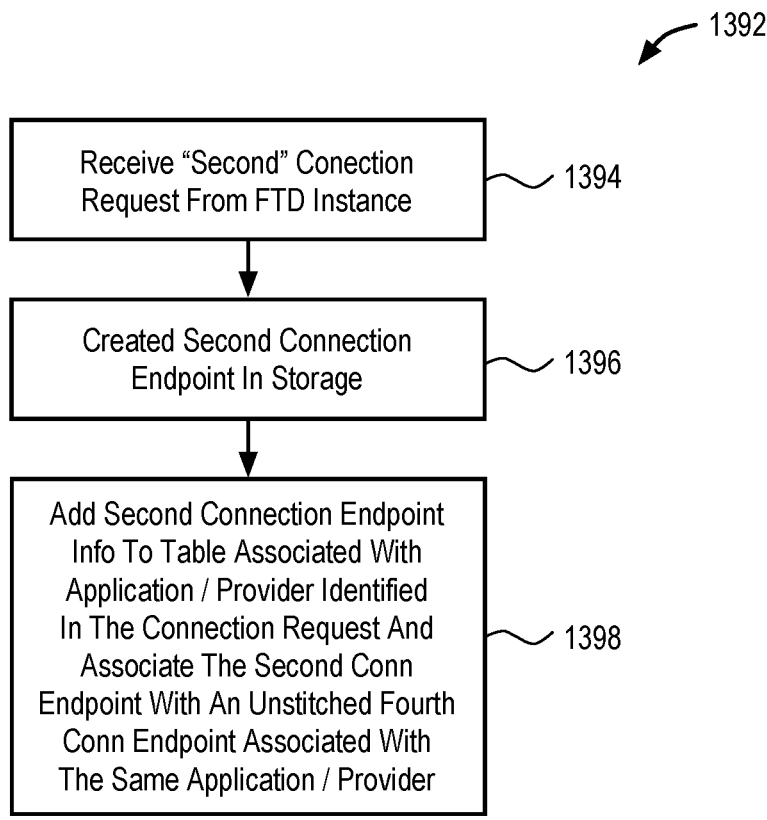
FIG. 13D is illustrative flow diagram representing a process using second connection request information received from a FTD instance to contribute to the creation of the information structure of FIG. 13B in accordance with some embodiments.

FIGS. 13C-13D are illustrative flow diagrams that illustrate processes involved in creation of the information structure 1380 of FIG. 13B in accordance with some embodiments. Referring to FIG. 13C, module 1386 configures a processor associated with the example TPS instance 1370 to receive a request from a BTD instance to create a fourth connection. Module 1388 configures the processor to create a fourth connection endpoint (e.g., one of B1 to B110) in response to the received request. Module 1390 adds information pertaining to the newly created fourth connection endpoint to the table 1380, which is associated with the same application/provider identified in the received request to create the fourth connection.

Referring to FIG. 13D, module 1394 configures a processor associated with the example TPS instance 1370 to receive a request from an FTD instance to create a second connection. Module 1396 configures the processor to create a second connection endpoint (e.g., one of F1 to F103) in response to the received request. Module 1398 adds information pertaining to the newly created second connection endpoint to the table 1380, which is associated with the same application/provider identified in the received request to create the second connection. Moreover, the information pertaining to the newly created fourth connection endpoint is associated in the table with an "unstitched" second connection endpoint, i.e. one that is not already associated with a second connection endpoint. Thus, the information structure 1380 is created based upon received fourth and second connection requests to associate such connections in pairs so that they can be stitched together as described with reference to FIG. 13A, for example. The stitched together endpoints within the example TPS instance 1370 form the final piece of an end-to-end connection between a user or device and a hosted application, in accordance with some embodiments.

TPS Layer Validity Services and Other Services

The provision of a selectable suite of services in an application delivery environment is sometimes referred to as "service chaining," since the services may be related or may be applied in a sequence, for example. In accordance with some embodiments, hosted application providers may specify which services to impart to requests for access to its hosted applications. Thus, in some embodiments, different services may be imparted to different applications.

Figure 13E:
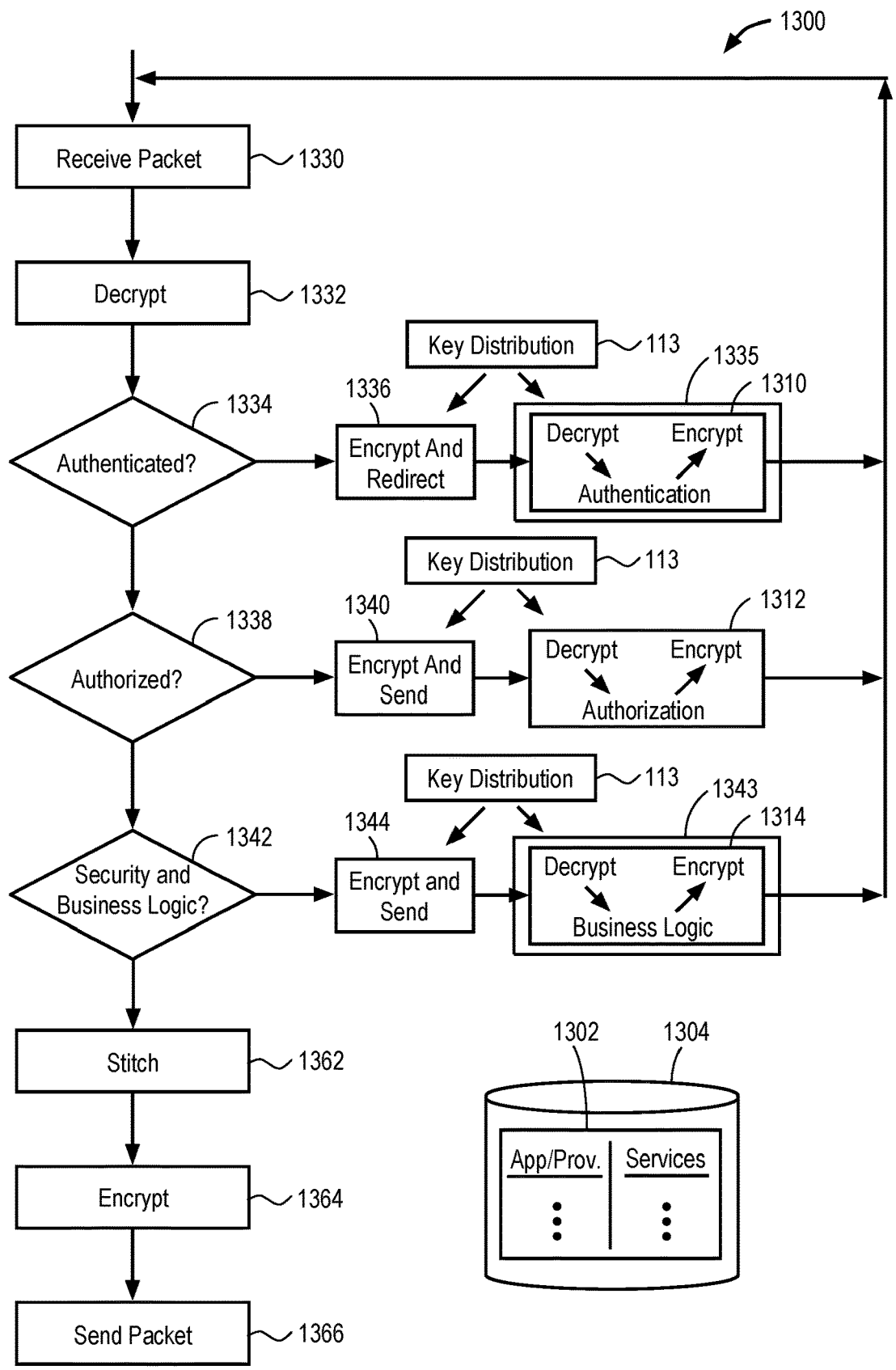
FIG. 13E is an illustrative flow diagram representing a TPS process in accordance with some embodiments.

FIG. 13E is an illustrative flow diagram representing a TPS process 1300 in accordance with some embodiments. By way of overview, the TPS process 1300 navigates through multiple service layers to impart selected services to a request (consisting of one or more packets) received by a TPS instance. The example service modules shown are authentication 1310, authorization 1312, and business logic 1314. In accordance with some embodiments, different providers may subscribe to different levels of validation services (e.g., user identification, authentication, authorization) and different business logic processes. A services designation information structure 1302 stored in a non-transitory machine readable storage device 1304 associates application-provider pairs with the services to be imparted.

Module 1330 receives a request from a user device over a first communication path to an FTD, which in turn, transmits it over a second communication path to a TPS configured to run the TPS process 1300. Module 1332 decrypts the received packet. Decision module 1334 determines whether authentication of the end user making the request is required. Additional explanation of determining whether authentication is required is provided below with reference to FIG. 14. In response to a determination that no authentication is required, control flows to decision module 1338, described below. Authentication may not be required, for example if a recent request from the same end user was authenticated. The determination includes referring to the services designation information structure 1302 to determine whether authentication is required for the application-provider pair identified in the request. In response to a determination that authentication is required, module 1336 encrypts the request and redirects it to the authentication module 1310. In accordance with some embodiments, a redirect may involve redirecting the requesting user device to the authentication module 1310. The authentication module 1310 performs an authentication process and redirects the request back to the TPS layer. In accordance with some embodiments, module 1310 redirects the user device back to the TPS layer, which again receives the original request at module 1330. In accordance with some embodiments, the authentication module 1310 includes a "login server" instance to handle all authentication and "login" actions. Module 1310 is shown within dashed lines 1335 to indicate that the authentication may be outsourced to a secure third party accessible over the external network 105. Additional explanation of authentication in accordance with some embodiments is provided below with reference to FIG. 15. The key distribution module 113 distributes encryption keys for use in encrypting and decrypting the request.

Assuming that the process 1300 reaches decision module 1338, a determination is made as to whether authorization is required for the received packet. The determination includes referring to the services designation information structure 1302 to determine whether authorization is required for the application-provider pair identified in the packet. In response to a determination that no authorization is required, control flows to decision module 1342, described below. In response to a determination that authorization is required, module 1340 encrypts the request and sends it to the authorization module 1312. The authorization module 1312 decrypts the request, performs an authorization process, and if the process is successful, re-encrypts the requests and sends it back to the TPS layer, which again receives the packet at module 1330. Authorization may include validation of the end user's group membership, the type of device in use by the end user device, and/or the end user's current geo-location. The key distribution module 113 distributes encryption keys for use in encrypting and decrypting the request.

Assuming that the process 1300 reaches decision module 1342, a determination is made as to whether business logic processes are required for the received packet. Different providers may specify different business logic for different applications, for example. Thus, different requests may be subject to different business logic. Business logic may include one or more security screening processes such as Layer 7 firewall security, IPS screen or antivirus screening, for example. Business logic also may include one or more business processes such as business-related analytics, for example. The business logic may include processes that are related in a service chain, for example. A determination includes referring to the services designation information structure 1302 to determine whether business logic is required for the application-provider pair identified in the packet. In response to a determination that no business logic is required, control flows to module 1362, described below. In response to a determination that business logic is required, module 1340 encrypts the request and sends it to the business logic module 1314. The business logic module 1314 decrypts the request, performs one or more processes specified by the services designation information structure 1302, re-encrypts the requests and sends it back to the TPS layer, which again receives the packet at module 1330. Module 1314 is shown within dashed lines 1343 to indicate that the business process may be outsourced to a secure third party accessible over the external network 105. The key distribution module 113 distributes encryption keys for use in encrypting and decrypting the request.

Assuming that the process 1300 reaches module 1362, a frontend user device connection (a second connection) within the FTD layer 108 on which the request arrived is stitched to a backend application agent connection (a fourth connection) within the BTD layer 112 that is associated with the application-provider pair identified in the request, to form a logical, end-to-end network communication path between the user device and the hosted application. Module 1364 re-encrypts the packet (using keys distributed by the key distribution module). Module 1366 transmits the packet, over the stitched together logical connection, to the agent associated with the application-provider pair identified in the request.

Authentication and State Retention

Figure 14:
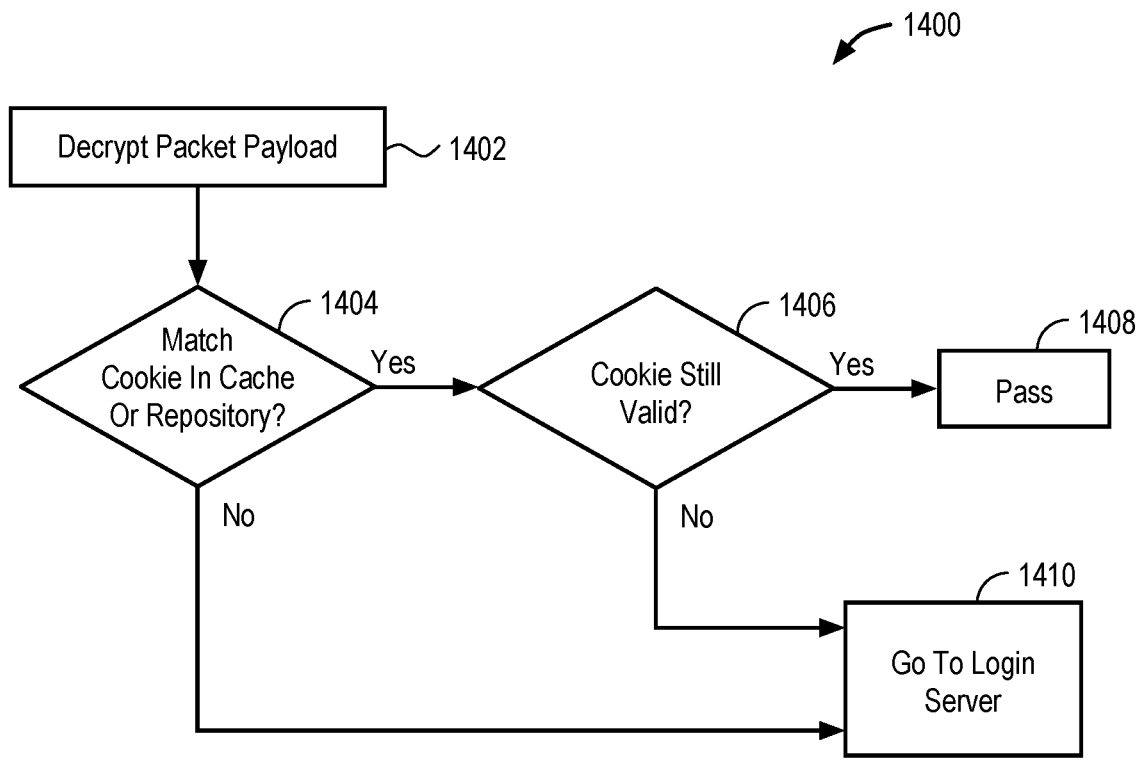
FIG. 14 is an illustrative drawing representing a process that includes determining whether to redirect a user to a login process for authentication in accordance with some embodiments.
Figure 15:
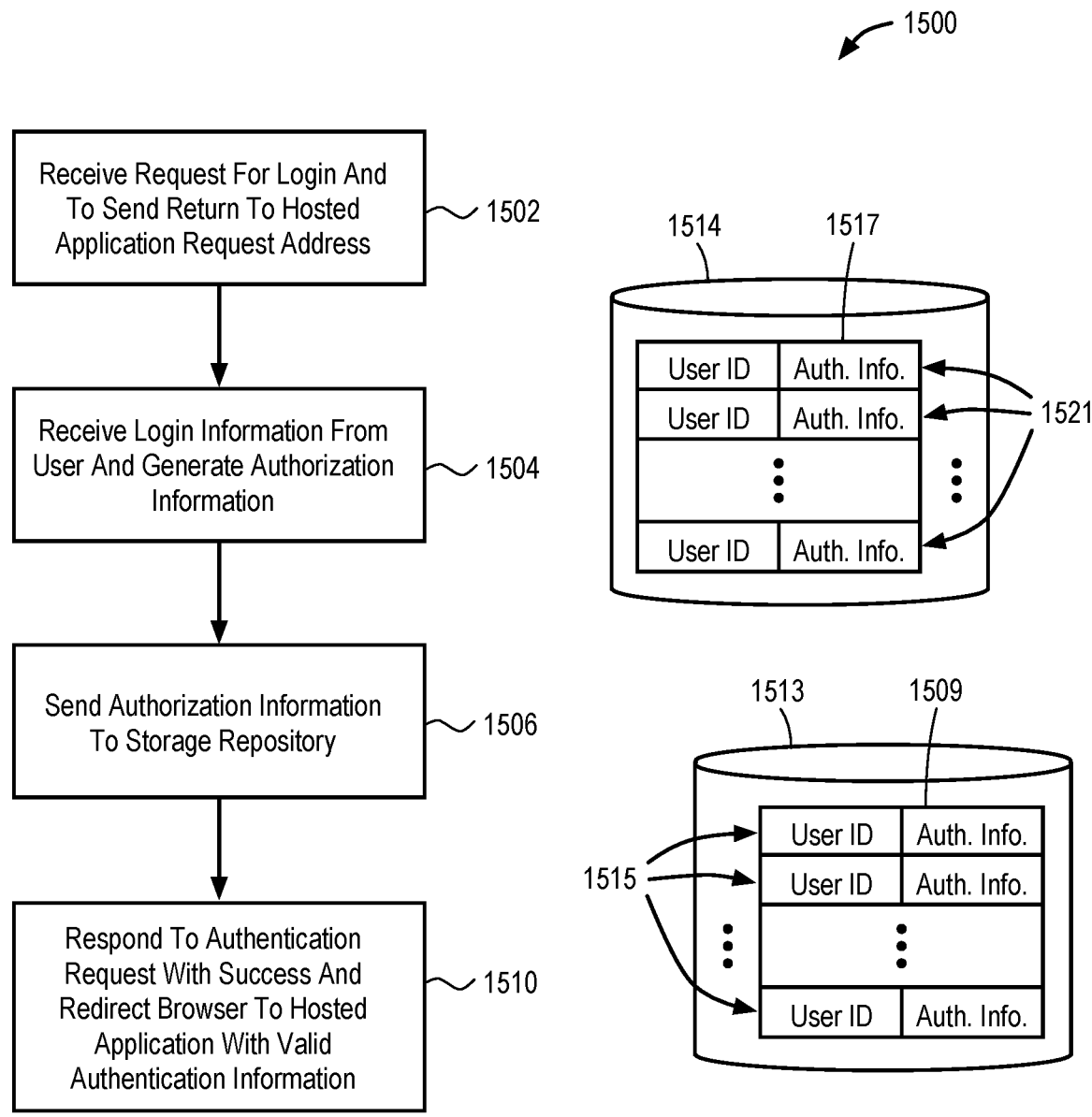
FIG. 15 is an illustrative drawing representing a login process in accordance with some embodiments.

FIG. 14 is an illustrative drawing representing a process 1400 that includes determining whether to redirect a user to a login process for authentication in accordance with some embodiments. FIG. 15 is an illustrative drawing representing a login process 1500 that includes storage of authentication state information in a non-transitory storage system 1507 accessible to the TPS layer 112 in accordance with some embodiments. More particularly, the process 1400 determines whether a request received from a user or device requesting access to a hosted application includes valid authentication information. The login process 1500 not only directs a user to provide information used to generate authentication information to be included in a request, but also inputs the authentication information to a persistent central/shared storage repository 1517 stored in a non-transitory machine readable storage device 15119 that is accessible to TPS instances of the TPS layer 112 for use in validating authentication information in later received requests for a hosted application. The persistent repository 1517 stores user (device) authentication information 1521 that has been received previously. In accordance with some embodiments, the persistent shared repository 1517 includes a highly available, high performance storage database that associates users with user information such as user authentication information. In the course of processing authentication for a user (device), a TPS instance (not shown) also inputs authentication information 1511 relating to the request to a local TPS cache structure 1513 that is associated with that TPS instance and that is stored within a non-transitory machine readable storage device 1515, so that the same authentication information can be used for subsequent packets associated with the same authenticated user (device).

Authentication information may be provided, for example, in a data structure commonly referred to as an authentication "cookie" that is returned to a user device web browser by a login server when a user logins in and that is included in each request sent by the user device access to a hosted application. When attempting to verify authentication information contained within a request, a TPS instance will first check its associated cache structure to determine whether the authentication information already is available locally. If the relevant authentication information is available locally, the request is considered to have valid authentication information. If not, the TPS instance will query the shared repository 1517 to verify authentication information contained in the request. If relevant authentication information is available in the shared repository 1517, the TPS instance will update its local cache so that it can be used for future request handling, and deem this request authenticated. If not, the TPS instance will redirect the user device to a login server.

It will be appreciated that the authentication information stored in cache 1509 associated with a TPS instance ensures quick responsiveness during normal TPS processing, and that storage of the authentication information redundantly in the shared repository 1517 provides a secure backup. Thus, the management system 104 can readily add or remove TPS instances based on metrics such as system-wide load, without loss of previously obtained authentication information, since authentication information used by each TPS instance is stored redundantly in the shared repository 1517, which remains intact even as TPS instances come and go. Furthermore, the redundant authentication information also protects against loss of authentication information in the event that a TPS instance suffers a failure and needs to restart, for example. In accordance with some embodiments, a representation of the authentication cookie also may be stored in the shared repository 1517 and in a local cache 1509.

Referring to FIG. 14, module 1402 decrypts the request payload so that authentication information can be evaluated. Decision module 1404 determines whether the authentication information, e.g., an authentication cookie, contained in the received packet matches authentication information stored in a local cache 1509 associated with the receiving TPS instance and, if not there, then in the shared repository 1517, as discussed above. In response to a determination that the received authentication information matches stored authentication information, either in the local cache 1509 or in the shared repository 1517, decision module 1406 determines whether the authentication information is still valid. For example, a determination may be made as to whether the authentication information has expired due to inactivity or due to a strict time-based expiry specified by the application provider system. In response to a determination by decision module 1406 that the authentication information remains valid, module 1408 indicates that the received packet has passed authenticated.

In response to a determination by decision module 1404 that there is no stored authentication information or by decision module 1406 that the stored authentication information is no longer valid, control flows to module 1410, which redirects the requesting user device to a login server 1410. In accordance with some embodiments, user devices typically use a browsers or browser-like devices to send requests for access to hosted applications. For example, assume that a request sent over the external network 105 by a user device to access a hosted application named "app1" hosted by a provider named "company1" is sent via the device's browser, and that the request is addressed to a URL that includes the information, "app1.company1.com". In response to decision module 1406 determining that the authentication information is no longer valid, module 1410 sends a redirect request over the network 105 to the user device's browser redirecting the browser to the network address of an associated login server. The redirect request includes a return referral to "app1.company1.com", for example. Continuing with the example, assuming that the user of the requesting device successfully completes a login process via the login server, the user device browser will send a request containing the newly entered authentication information request addressed to the URL that includes the information, "app1.company1.com", and the authentication process 1400 repeats, and this next time, with valid authentication information stored in the shared repository 1517 due to a successful prior login, for example, as explained below.

Referring again to FIG. 15, module 1502 receives a request over network 105 for user login with additional information to enable it to redirect the user device back to the hosted application upon successful authentication process completion. Continuing with the above example, the request may be a browser request, and the return address may include a URL containing the information "app1.company1.com". Module 1504 configures a login server to receive login information from a user in response to the received request and to generate authorization information in response to a user's successfully entering the requested user information. In accordance with some embodiments, a login server may expect the user to provide an email address, a password and other identifying information (e.g. a one-time password) that can collectively be used to uniquely identify the user. Module 1506 stores corresponding authentication state information in the shared repository 1517. Module 1510 responds to the browser with a redirection directive back to the application delivery system 102, and the request is once again received by the frontend layer 108. The application delivery system 102 again processes the request. This time, however, the request contains valid authentication information derived during the login process of module 1504, and that authentication information can be validated through information stored in the shared repository 1517 as a result of the operation of module 1506.

Management System

Figure 16:
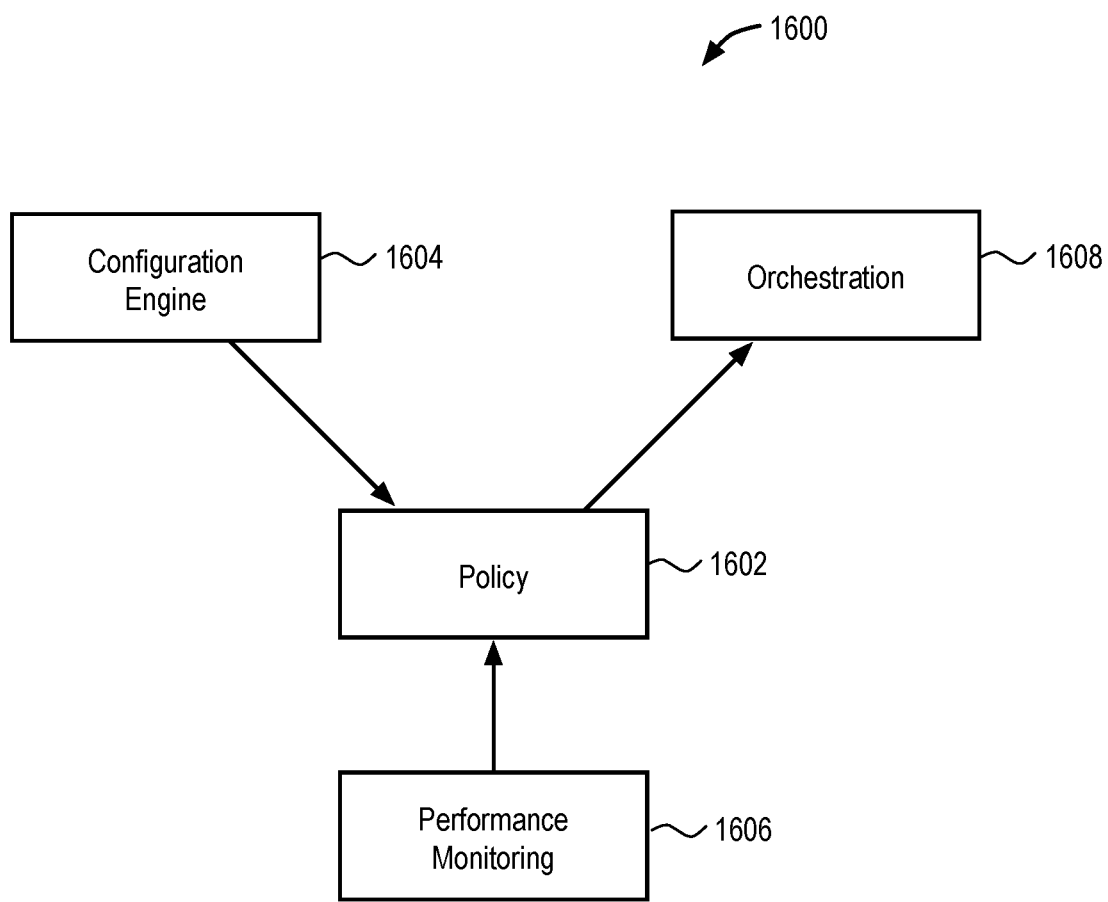
FIG. 16 is a functional block diagram representing a management system in accordance with some embodiments.

FIG. 16 is a functional block diagram representing a management system 104 in accordance with some embodiments. A policy engine 1602 applies rules to determine provider/application configurations based upon performance information. A configuration engine 1602 receives configuration information on behalf of individual providers for delivery of individual host applications to users over the network 105 and provides the configuration information to the policy engine 1602. More specifically, for each of one or more host applications, for each of multiple providers, the configuration engine 1604 inputs to the policy engine 1602 information to configure FTDs, TPSs, BTDs, agent(s) and the first and second DNS servers to deliver the host application to be delivered by the provider to users over the network 105. A performance monitoring engine 1606 collects information about the delivery of individual host applications by individual providers and provides the performance information to the policy engine 1602. More particularly, for each of one or more host applications, for each of multiple providers, the performance monitoring engine 1606 collects information about the performance of the FTDs, TPSs, BTDs and agent(s) configured to serve the host application delivered by the provider and inputs the performance information to the policy engine 1602. An orchestration engine 1608 receives configuration instructions from the policy engine 1602 to implement configurations determined based upon the configuration information input from the configuration engine 1604 and/or performance information input from the performance monitoring engine 1606. In response to determinations received from the policy engine 1602, the orchestration engine 1608 adds and/or deletes FTDs, TPSs, BTDs and agent(s) for individual host applications of individual providers.

Figure 17:
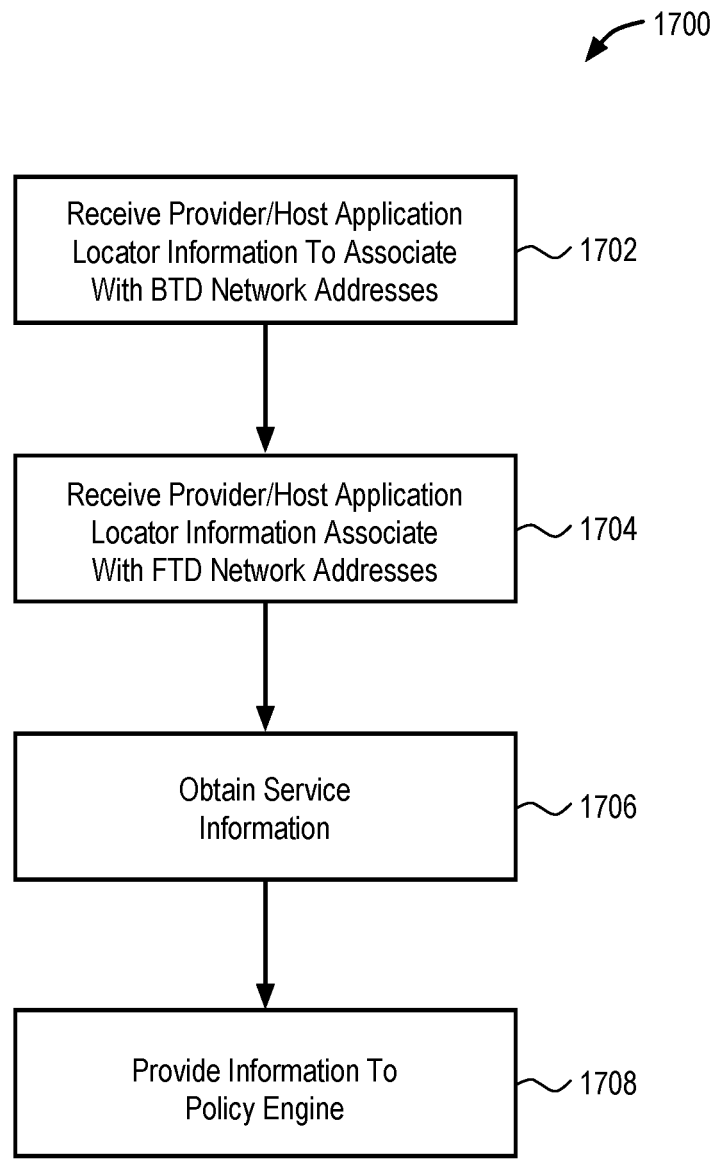
FIG. 17 is an illustrative flow diagram representing a process to obtain configuration information from a provider to configure the delivery system to deliver a host application to users over the network in accordance with some embodiments.

FIG. 17 is an illustrative flow diagram representing a process 1700 to obtain configuration information from a provider to configure the delivery system 102 to deliver a host application to users over the network 105 in accordance with some embodiments. Module 1702 receives provider input that indicates first locator information to be used by an agent to address one or more BTDs associated with a host application. The first locator information indicates a host application identifier and an associated provider identifier for use in the first DNS server 302 shown in FIG. 3, which associates locator information with BTD addresses. Module 1704 receives provider input that indicates second locator information to be used by users to address one or more FTDs associated with a host application. The second locator information indicates a host application identifier and an associated provider identifier for use with the second DNS server 304 shown in FIG. 3, which associates locator information with FTD addresses. Module 1706 receives provider information concerning services such as security services and business logic to be applied to a hosted application. Module 1708 provides the received first and second locator information to the policy engine 1602.

Figure 18:
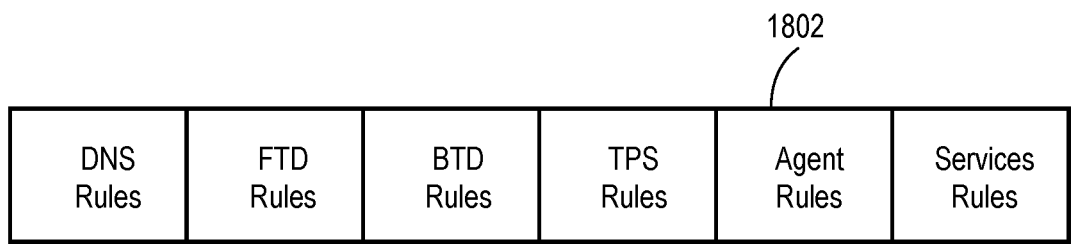
FIG. 18 is an illustrative information structure that sets forth configuration rules stored in a non-transitory machine readable storage device in accordance with some embodiments.

FIG. 18 is an illustrative information structure 1802 that sets forth configuration rules stored in a non-transitory machine readable storage device in accordance with some embodiments. The policy engine 1602 uses rules to determine configuration of the delivery system 102 agents and first and second DNS servers to deliver hosted applications to users. Rules are provided for configuration of DNS servers, FTDs, BTDs, TPS, Agents and services to be imparted to different services to be imparted to different host applications.

Figure 19:
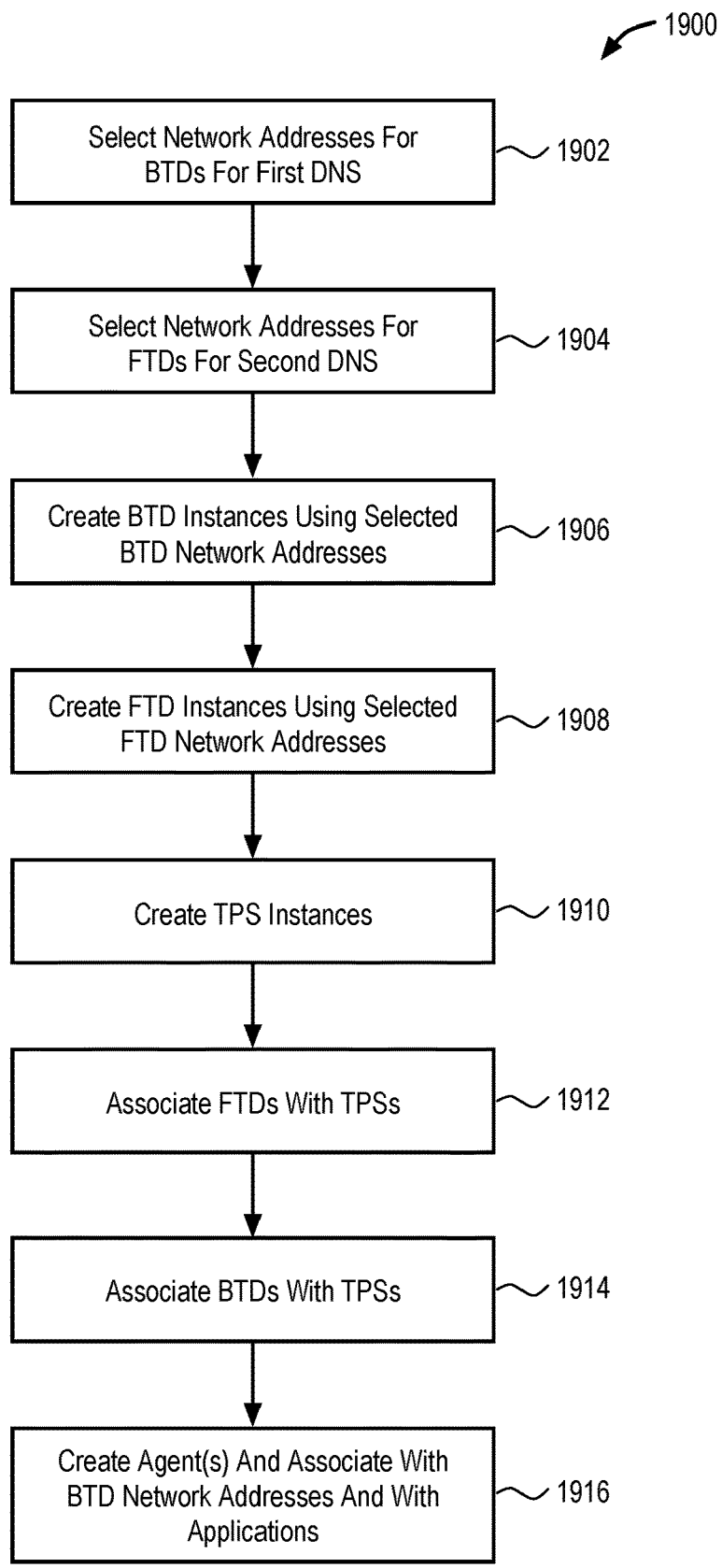
FIG. 19 is an illustrative flow diagram representing a process implemented using the orchestration engine according to rules of FIG. 18 imposed by the policy engine to configure a delivery system to deliver one or more applications on behalf of a provider in accordance with some embodiments.

FIG. 19 is an illustrative flow diagram representing a process 1900 implemented using the orchestration engine 1608 according to rules of FIG. 18 imposed by the policy engine 1602 to configure the delivery system 102 to deliver one or more applications on behalf of a provider in accordance with some embodiments. From the following description, it will be appreciated that the orchestration engine 1608 actually is implemented as a distributed engine that effects changes in the delivery system 102, first and second DNS servers and at a provider system where an agent is deployed. Module 1902 selects BTD network addresses and associates them within the first DNS server with first locator information obtained from a provider for the application. Module 1904 selects FTD network addresses and associates them within the second DNS server with second locator information obtained from the provider for the application. Module 1906 configures (or creates, if additional resources are needed) one or more BTD instances using the selected BTD network addresses. Module 1908 configures (or creates, if additional resources are needed) one or more FTD instances using the selected FTD network addresses. Module 1910 configures (or creates, if additional resources are needed) one or more TPS instances using information such as information obtained as to service chaining to be associated with an application. Additional details of creation of BTDs, FTDs and TPSs are provided below. Module 1912 creates tables, such as table 812 in FIG. 8, to associate FTDs with TPSs. Module 1914 creates tables, such as table 1012 in FIG. 10, to associate BTDs with TPSs. Module 1916 creates one or more agents and associates the agents with the selected BTD network addresses and with one or more hosted applications.

Figure 20:
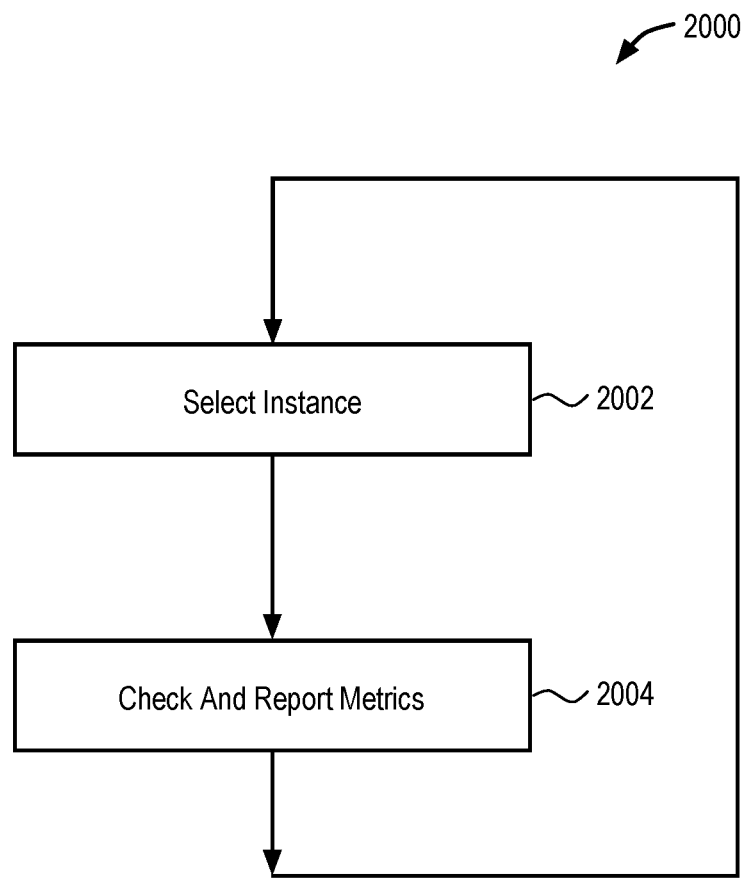
FIG. 20 is an illustrative flow diagram representing a process performed using the performance monitoring engine to monitor performance of instances in accordance with some embodiments.

FIG. 20 is an illustrative flow diagram representing a process 2000 performed using the performance monitoring engine 1606 to monitor performance of instances in accordance with some embodiments. Referring back to FIG. 2, each of performance monitoring modules 111-1 to 111-3 runs an instance of the process 2000. Module 111-1 monitors performance of FTD instances. Specifically, module 2002 selects an instance from within the FTD layer 108. Module 2004 checks performance metrics for the selected FTD instance, such as CPU usage, memory utilization, disk utilization, file descriptor utilization, and others, and reports performance to the policy engine 1602 over the network 105. Module 2002 selects a next FTD instance and the process repeats. Similarly, modules 111-2 and 111-3 use the process 2000 to monitor TPS performance and BTD performance, respectively. TPS performance metrics include CPU usage, memory utilization, disk utilization, file descriptor utilization, and others. BTD performance metrics include CPU usage, memory utilization, disk utilization, file descriptor utilization, and others.

Figure 21:
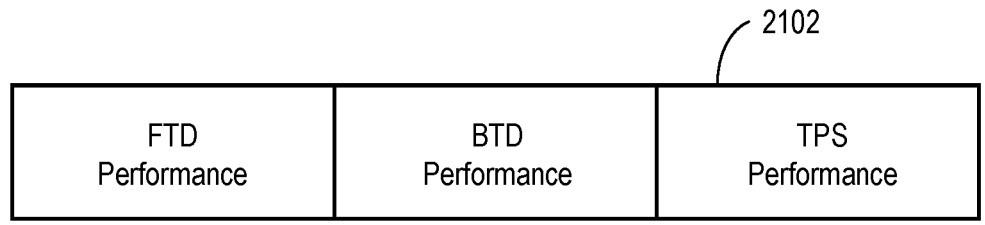
FIG. 21 is an illustrative information structure that sets forth monitored performance information that is obtained using the process of FIG. 20 in accordance with some embodiments.

FIG. 21 is an illustrative information structure 2102 that sets forth monitored performance information that is obtained using the process of FIG. 20 and that is stored in a non-transitory machine readable storage device in accordance with some embodiments. The policy engine 1602 uses the performance information in conjunction with configuration rules of the information structure 1802 of FIG. 18 to determine whether configuration changes are required for one or more of the DNS servers, FTDs, BTDs, TPS, Agents and services to be imparted to different services to be imparted to different host applications.

Figure 22:
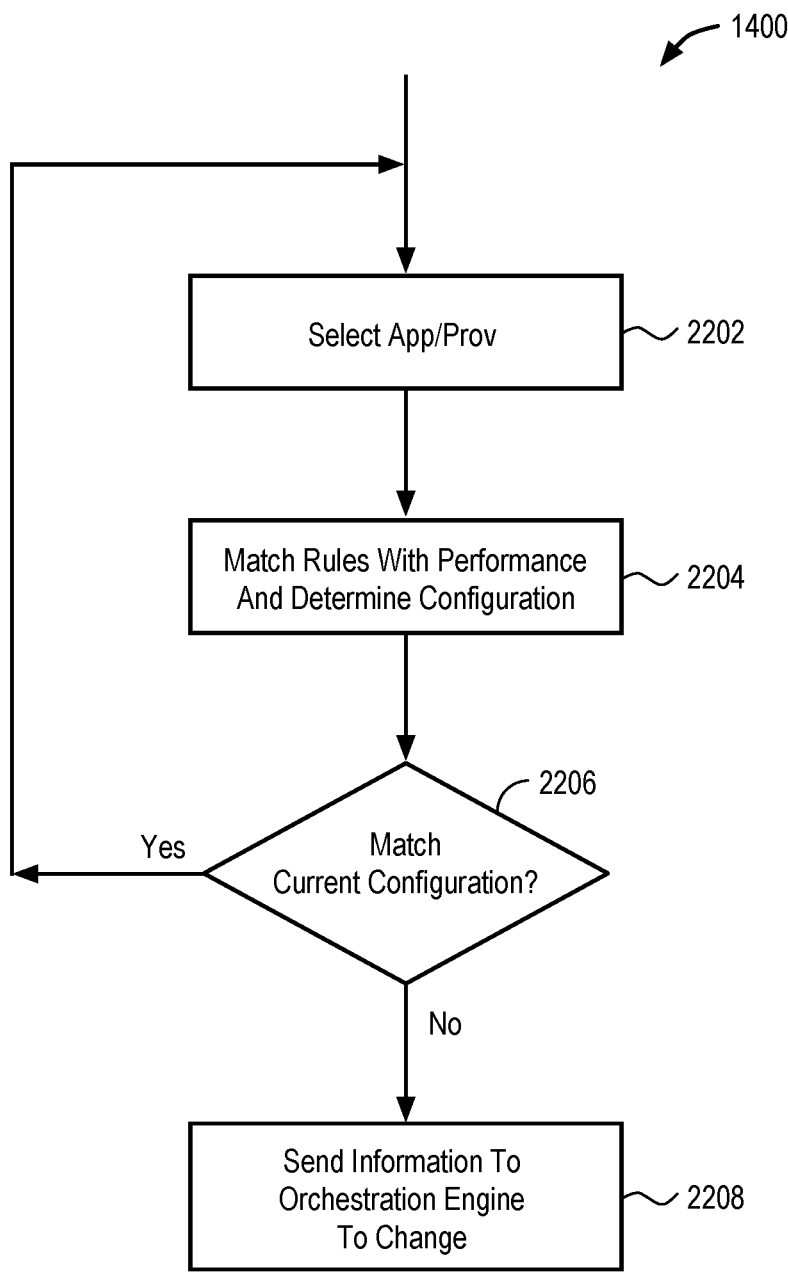
FIG. 22 is an illustrative flow diagram representing a process performed using a policy engine to evaluate whether a configuration change is required based upon performance monitoring information in accordance with some embodiments.

FIG. 22 is an illustrative flow diagram representing a process 2200 performed using the policy engine 1602 to evaluate whether a configuration change is required based upon performance monitoring information in accordance with some embodiments. Module 2202 selects an application/provider pair for evaluation. Module 2204 matches configuration rules represented by information structure 1802 with current performance monitoring information represented by information structure 2102. Decision module 2206 determines whether configuration changes are required. In response to a determination that configuration changes are required, module 2208 sends information to the orchestration engine 2208 to implement the changes. In response to a determination that changes are not required, control flows back to module 2202 and a different application/provider pair is selected for evaluation.

Figure 23:
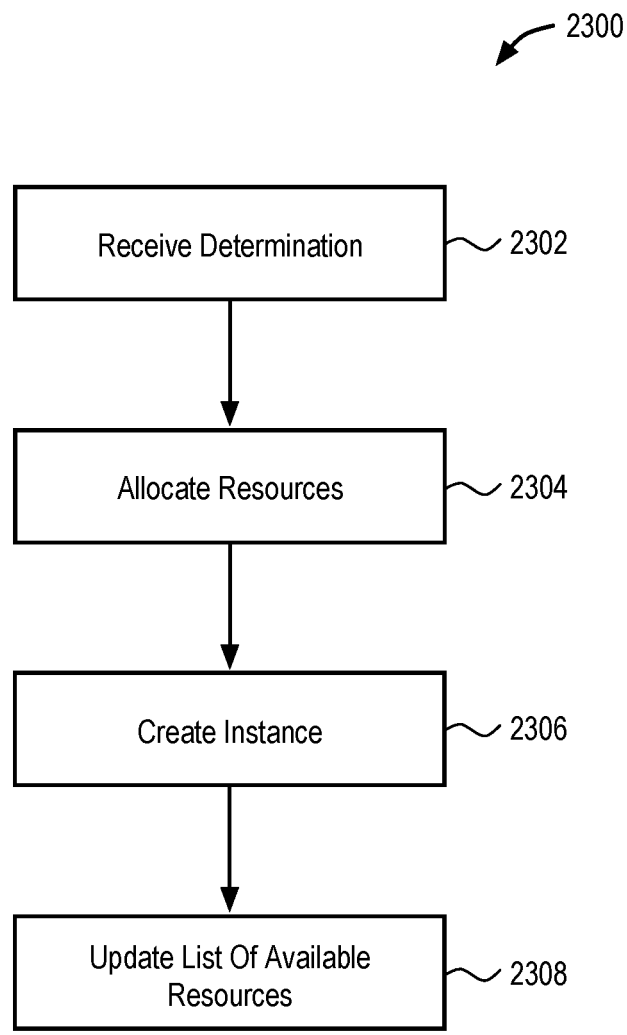
FIG. 23 is an illustrative flow diagram representing a configuration process to add an instance based upon performance metrics in response to a policy determination in accordance with some embodiments.

FIG. 23 is an illustrative flow diagram representing a configuration process 2300 to add an instance based upon performance metrics in response to a policy determination in accordance with some embodiments. The configuration process 2300 is performed using the orchestration engine 1608 in accordance with some embodiments. Moreover, it will be appreciated that the process 2300 may execute, at least in part, within the delivery system 102 and/or within a provider system. Module 2302 receives a determination to add an instance. The determination may be to add an FTD instance, a BTD instance, a TPS instance and/or an Agent instance in accordance with some embodiments. Module 2304 allocates resources to the new instance. Module 2306 makes the necessary requests in the relevant network to create the instance. If instance creation as part of 2306 is successful, Module 2308 updates the list of resources available for use such that the orchestration engine 1608 may apply necessary configuration to the newly created instance. For example DNS information is updated to include network address information for newly added FTD instances and for newly added BTD instances. Updated mapping information indicating mapping associations between FTDs and TPSs and between BTDs and TPSs is added when one or more FTD, BTD and/or TPSs are added.

Figure 24:
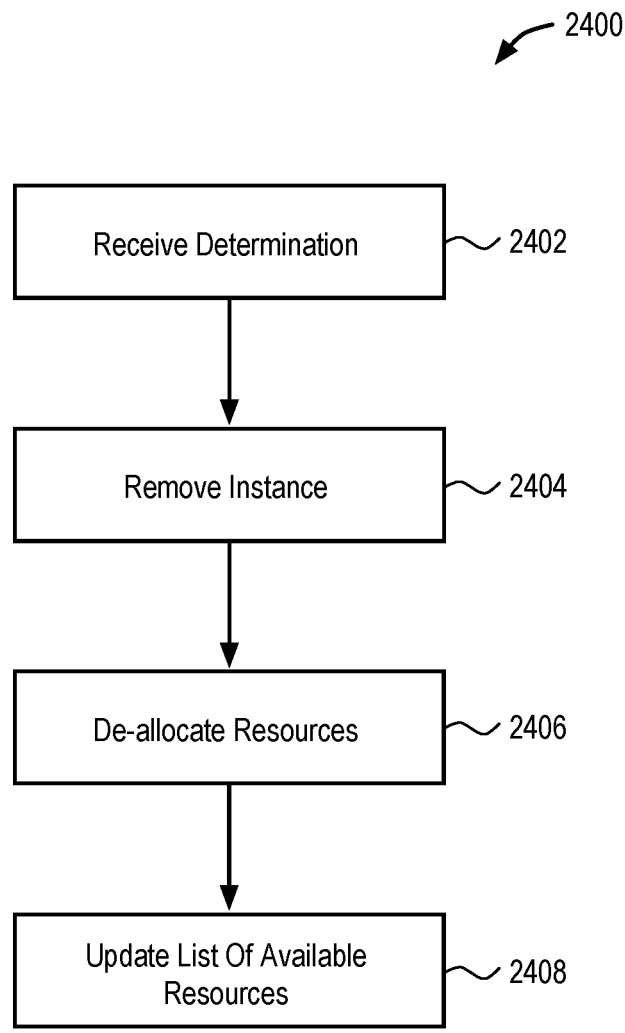
FIG. 24 is an illustrative flow diagram representing a configuration process to stop using an instance based upon performance metrics in response to a policy determination in accordance with some embodiments.

FIG. 24 is an illustrative flow diagram representing a configuration process 2400 to stop using an instance based upon performance metrics in response to a policy determination in accordance with some embodiments. The configuration process 2400 is performed using the orchestration engine 1608 in accordance with some embodiments. The process 2400 may execute, at least in part, within the delivery system 102 and/or within a provider system. Module 2402 receives a determination to stop using an instance. The determination may be to stop using an FTD instance, a BTD instance, a TPS instance and/or an agent instance in accordance with some embodiments. Module 2404 makes the necessary requests in the relevant network to destroy the instance. Module 2406 de-allocates resources associated with the removed instance. Module 2408 updates the list of resources available for use such that the orchestration engine 2408 may apply necessary configuration to the remaining instances.

Figure 25:
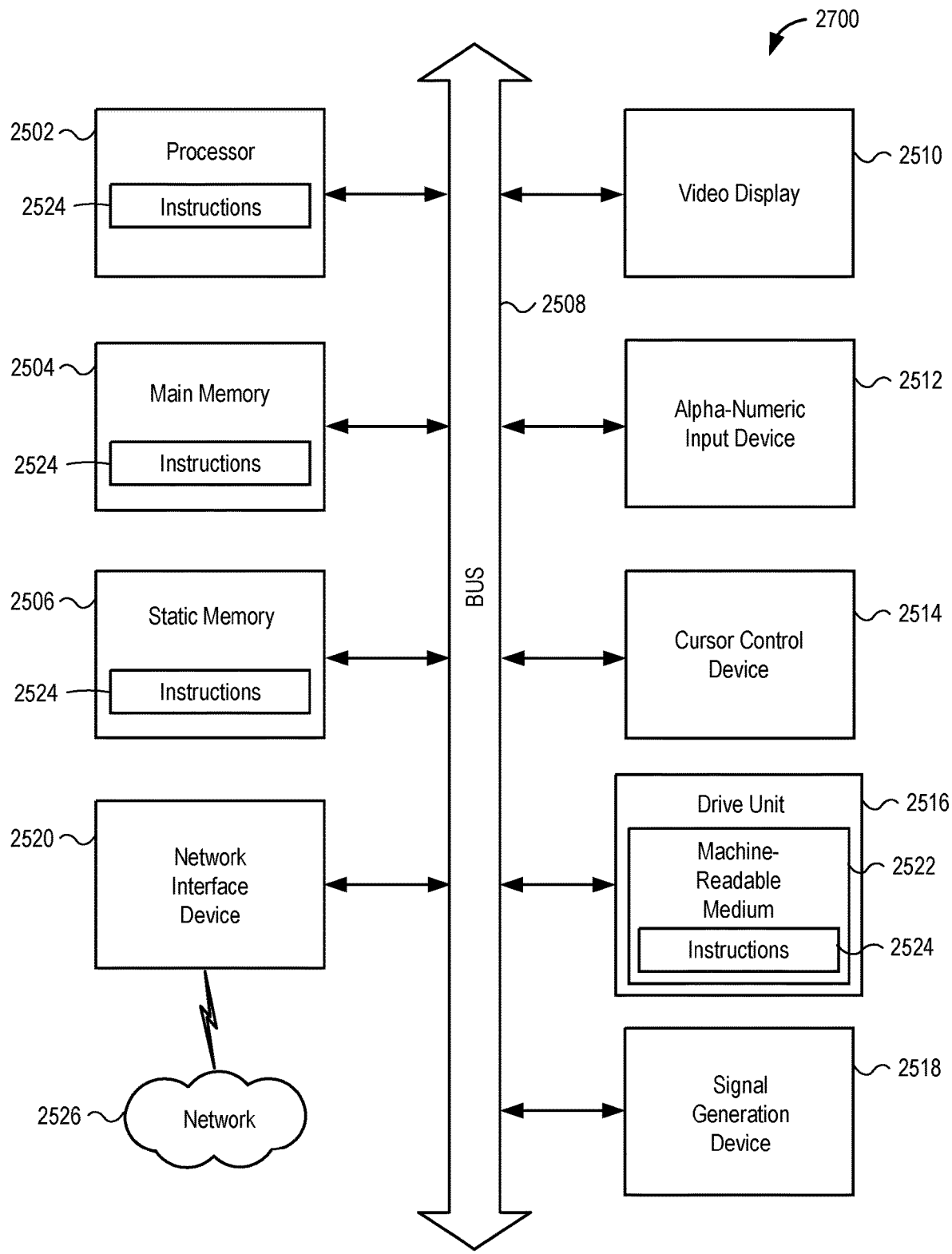
FIG. 25 is an illustrative block diagram of a computer processing system within which a set of instructions, for causing the computer to perform any one or more of the methodologies discussed herein, may be executed.

FIG. 25 is an illustrative block diagram of a computer processing system within which a set of instructions, for causing the computer to perform any one or more of the methodologies discussed herein, may be executed. The computer system, or variations thereof, may be used within provider systems, within a delivery system and within a management system. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment, for example. In a networked deployment, the computer may operate in the capacity of a server or a client computer in a server-client network environment, or as a peer computer in a peer-to-peer (or distributed) network environment, for example.

The example computer processing system 2500 includes processor 2522 (e.g., a central processing unit (CPU), a graphics processing unit (GPU) or both), main memory 2504 and static memory 2506, which communicate with each other via bus 2508. The processing system 2500 may further include video display unit 2520 (e.g., a plasma display, a liquid crystal display (LCD) or a cathode ray tube (CRT)). The processing system 2500 also includes alphanumeric input device 2522 (e.g., a keyboard), a user interface (UI) navigation device 2514 (e.g., a mouse, touch screen, or the like), a disk drive unit 2516, a signal generation device 2518 (e.g., a speaker), and a network interface device 2520.

The disk drive unit 2526 includes computer-readable storage device 2522 on which is stored one or more sets of instructions and data structures (e.g., software 2524) embodying or utilized by any one or more of the methodologies or functions described herein. The software 2524 may also reside, completely or at least partially, within a computer readable storage device such as the main memory 2504 and/or within the processor 2522 during execution thereof by the processing system 2500, the main memory 2504 and the processor 2522 also constituting non-transitory computer-readable media.

The software 2524 may further be transmitted or received over network 2526 via a network interface device 2520 utilizing any one of a number of well-known transfer protocols (e.g., HTTP).

While the computer-readable storage device 2522 is shown in an example embodiment to be a single medium, the term "computer-readable storage device" should be taken to include a single medium or multiple media (e.g., a centralized or distributed database, and/or associated caches and servers) that store the one or more sets of instructions. The term, "non-transitory computer-readable storage device", shall be taken to include, but not be limited to, solid-state memories, and non-transitory optical and magnetic media. The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A system to deliver an application, hosted by a private application provider system, over a network, the private application provider hosting an application agent, comprising:
   a hardware processor and a storage device configured to provide:
      a first interface that includes a computing entity of a first type;
      a second interface that includes a computing entity of a second type;
      a security interface that includes a computing entity of a third type comprising a decryption service, an authentication service, an encryption service, and a connection stitching service;
   wherein in response to creation of a pool of third connections by the application agent the computing entity of the second type within the second interface provides a fourth connection to a computing instance of the third type within the security interface, wherein each fourth connection corresponds to a separate third connection in the pool of third connections;
   wherein a computing entity of the first type within the first interface provides a second connection to a computing entity of the third type and uses that second connection to send to the computing entity of the third type a request for access to the application, the request for access having been received over a first connection established to the computing entity of the first type;
   wherein the decryption service receives the request for access over the second connection and decrypts it to generate a result;
   wherein, upon a successful authentication of the result by the authentication service, the encryption service re-encrypts the request for access and the stitching service creates a connection pair between the second connection and one of the fourth connections; and
   wherein the request for access as re-encrypted is then provided to a computing entity of the second type over the connection pair.

2. The system as described in claim 1 wherein the application agent is disposed to run behind a firewall within the private application provider system.

3. The system as described in claim 1 further including a load monitor to monitor a load resulting from requests for access to the application.

4. The system as described in claim 3 further including a management module to manage creation of the computing entities based at least in part on the load.

5. The system as described in claim 4 further including management module to manage a number of third connections in the pool based at least in part on the load.

6. The system as described in claim 1 wherein the decryption service and the encryption service operate according to one of: SSL, and IPSec.

* * * * *